US012747838B2

(12) United States Patent
Hikmet et al.

(10) Patent No.: US 12,747,838 B2
(45) Date of Patent: Sep. 29, 2026

(54) LASER-PHOSPHOR BASED STAGE LIGHTING ENGINE WITH A HIGHLY EFFICIENT POLARIZATION MAINTAINING DIFFUSER CONFIGURATION

(71) Applicant: SIGNIFY HOLDING B.V., Eindhoven (NL)

(72) Inventors: Rifat Ata Mustafa Hikmet, Eindhoven (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/146,961

(22) PCT Filed: Jan. 9, 2024

(86) PCT No.: PCT/EP2024/050318
§ 371 (c)(1),
(2) Date: Jul. 10, 2025

(87) PCT Pub. No.: WO2024/149717
PCT Pub. Date: Jul. 18, 2024

(65) Prior Publication Data

US 2026/0218862 A1 Jul. 30, 2026

(30) Foreign Application Priority Data

Jan. 10, 2023 (EP) .................................... 23150850

(51) Int. Cl.
*F21K 9/64* (2016.01)
*F21Y 115/30* (2016.01)

(52) U.S. Cl.
CPC ............ *F21K 9/64* (2016.08); *F21Y 2115/30* (2016.08)

(58) Field of Classification Search
CPC ........................ F21K 9/60-65; F21Y 2115/30
See application file for complete search history.

(56) References Cited

U.S. PATENT DOCUMENTS

| | | | | |
|---|---|---|---|---|
| 10,838,289 | B2 * | 11/2020 | Tanaka ................. | H04N 9/3105 |
| 2012/0140183 | A1 | 6/2012 | Tanaka et al. | |
| 2014/0240676 | A1 | 8/2014 | Maes et al. | |

FOREIGN PATENT DOCUMENTS

| | | | |
|---|---|---|---|
| CN | 103913936 | B | 12/2016 |
| CN | 107272312 | A | 10/2017 |

(Continued)

*Primary Examiner* — Jason M Han

(57) ABSTRACT

The invention provides light generating system (1000) comprising (i) one or more light generating devices (100), (ii) a luminescence conversion arrangement (2000), and (iii) a diffuser arrangement (4000), wherein: the one or more light generating devices (100) are configured to generate device light (101); wherein the one or more light generating devices (100) comprises a solid state light source (10), wherein the solid state light source (10) comprises one or more of a laser diode and a superluminescent diode; wherein the light generating system (1000) is configured such that, in an operational mode of the light generating system (1000), (a) at least part of the device light (101) propagates to the luminescence conversion arrangement (2000), and (b) at least part of the device light (101) propagates to the diffuser arrangement (4000); wherein the at least part of the device light (101) propagating to the diffuser arrangement (4000) is polarized light comprising one of a first linear polarization and a second linear polarization; the luminescence conversion arrangement (2000) comprises a luminescent material (200) configured to convert at least part of the device light (101) received by the luminescent material (200) into luminescent material light (201); wherein the luminescent material (200) is configured in the reflective mode relative to device light (101) irradiating the luminescent material (200); the diffuser arrangement (4000) is configured to generate diffused device light (401) from at least part of the device light (101) received by the diffuser arrangement (4000); wherein the diffuser arrangement (4000) comprises a polar- (Continued)

izing beam splitter (410), a quarter wave plate (420), a polarization maintaining diffuser (430), and a specularly reflective mirror (440), wherein the mirror (440) comprises a metallic mirror (440); the polarizing beam splitter (410) is (i) transmissive for one of the light having the first linear polarization and light having the second linear polarization and (ii) reflective for the other one of the light having the first polarization and the light having the second linear polarization; and the light generating system (1000) is configured to generate system light (1001) comprising in the operational mode of the light generating system (1000) (i) the diffused device light (401) and (ii) the luminescent material light (201).

15 Claims, 6 Drawing Sheets

(56) References Cited

FOREIGN PATENT DOCUMENTS

| | | | |
|---|---|---|---|
| WO | 2020057299 | A1 | 3/2020 |
| WO | 2022143318 | A1 | 7/2022 |

* cited by examiner

LASER-PHOSPHOR BASED STAGE LIGHTING ENGINE WITH A HIGHLY EFFICIENT POLARIZATION MAINTAINING DIFFUSER CONFIGURATION

CROSS-REFERENCE TO PRIOR APPLICATIONS

This application is the U.S. National Phase application under 35 U.S.C. § 371 of International Application No. PCT/EP2024/050318, filed on Jan. 9, 2024, which claims the benefit of European Patent Application No. 23150850.8, filed on Jan. 10, 2023. These applications are hereby incorporated by reference herein.

FIELD OF THE INVENTION

The invention relates to a light generating system. The invention further relates to a lighting device comprising such light generating system.

BACKGROUND OF THE INVENTION

Laser-phosphor based stage lighting engines are known in the art. For instance, WO2022143318 describes a light emitting device, comprising a first light source, a second light source, a dichroic mirror, a wavelength conversion apparatus, a first light path adjusting apparatus or a second light path adjusting apparatus, and a first scattering optical system. In the present invention, the light mixing effect of emergent light can be improved by using the first scattering optical system. The color temperature of the emergent light of the light emitting device can be freely adjusted by independently adjusting the power of the first light source and the power of the second light source. A laser capable of emitting light of different dominant wavelengths can be used in the second light source to improve the color rendering index of the emergent light of the light emitting device. Light emitted by the first light source in the present invention is all used for exciting the wavelength conversion apparatus. Compared with existing technical solutions, the light emitting device provided by the present invention can achieve output of higher light flux in the case that an optical expansion amount is not increased, and if a polarization selection element is used in the first light source in a matching mode, the output of light flux of the light emitting device can be further improved.

SUMMARY OF THE INVENTION

High brightness light sources can be used in various applications including spots, stage-lighting, headlamps, home and office lighting, and automotive lighting. For this purpose, laser-phosphor technology can be used, wherein a laser provides laser light and a remote phosphor converts laser light into converted light.

A relatively straightforward way to produce white light using lasers is to use blue laser light in combination with phosphor converted light to produce white light. However, current laser lighting fixtures may be unable to produce a safe and high-performance strong beam of light. For instance, a damage of optics may lead to outcoupling of high intensity light. Other problems associated with such laser light sources may come with the desire to create compact high-power devices.

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

According to a first aspect, the invention provides a light generating system ("system") comprising one or more light generating devices, a luminescence conversion arrangement, and a diffuser arrangement. The one or more light generating devices may especially be configured to generate device light. Especially, the one or more light generating devices may comprise a (solid-state) light source. More especially, the (solid-state) light source may comprise one or more of a laser diode and a superluminescent diode. Further, in embodiments, the light generating system may be configured such that (in an operational mode of the light generating system), (a) at least part of the device light propagates to the luminescence conversion arrangement, and (b) at least part of the device light propagates to the diffuser arrangement. Especially, the at least part of the device light propagating to the diffuser arrangement comprises polarized light comprising one of a first (linear) polarization and a (linear) second polarization. Further, the luminescence conversion arrangement may, in embodiments, comprise a luminescent material configured to convert at least part of the device light received by the luminescent material into luminescent material light. Especially, the luminescent material may be configured in the reflective mode relative to device light irradiating the luminescent material. Yet further, in embodiments, the diffuser arrangement may be configured to generate diffused device light from at least part of the device light received by the diffuser arrangement. Especially, the system, more especially the diffuser arrangement, may comprise a polarizing beam splitter, a quarter wave plate, a polarization maintaining diffuser, and a mirror. Herein, the mirror may especially be a specularly reflective mirror. More especially, the mirror may comprise a metallic mirror. Further, the polarizing beam splitter may be (i) transmissive for one of the light having the first polarization and light having the second polarization and (ii) reflective for the other one of the light having the first polarization and the light having the second polarization. Further, in embodiments, the quarter wave plate may be configured between the beam splitter and the polarization maintaining diffuser. Yet further, in embodiments, the polarization maintaining diffuser may be configured between the quarter wave plate and the (specularly reflective) mirror. Especially, the polarization maintaining diffuser may be configured as a diffuser for device light having a polarization imposed by the quarter wave plate to the device light. Further, one or more second optical elements may be configured to collimate the device light. Especially, one of the following may apply: (i) a primary second optical element may be configured between at least one of the one or more light generating devices and the luminescent material, and (ii) a secondary optical element may be configured between the quarter wave plate and the diffuser. Yet further, the light generating system may be configured to generate system light comprising (in the operational mode of the light generating system) the diffused device light and the luminescent material light. Hence, in specific embodiments, the invention provides a light generating system comprising (i) one or more light generating devices, (ii) a luminescence conversion arrangement, and (iii) a diffuser arrangement, wherein the one or more light generating devices are configured to generate device light, wherein the one or more light generating devices comprises a solid state light source, wherein the solid state light source comprises one or more of a laser diode and a superluminescent diode; wherein the light generating system is configured such that, in an operational mode of the light generating system, (a) at least part of the device light propagates to the luminescence conversion arrangement, and (b) at least part of the device light propagates to the diffuser arrangement; wherein the at least part of the device light propagating to the diffuser arrangement is polarized light comprising one of a first (linear) polarization and a second (linear) polarization; wherein the luminescence conversion arrangement comprises a luminescent material configured to convert at least part of the device light received by the luminescent material into luminescent material light; wherein the luminescent material is configured in the reflective mode relative to device light irradiating the luminescent material; wherein the diffuser arrangement is configured to generate diffused device light from at least part of the device light received by the diffuser arrangement; wherein the diffuser arrangement comprises a polarizing beam splitter, a quarter wave plate, a polarization maintaining diffuser, and a specularly reflective mirror, wherein the mirror comprises a metallic mirror; wherein the polarizing beam splitter is (i) transmissive for one of the light having the first polarization and light having the second polarization and (ii) reflective for the other one of the light having the first polarization and the light having the second polarization; wherein the quarter wave plate is configured between the beam splitter and the polarization maintaining diffuser; the polarization maintaining diffuser is configured between the quarter wave plate and the specularly reflective mirror; wherein the polarization maintaining diffuser is configured as a diffuser for device light having a polarization imposed by the quarter wave plate to the device light; wherein one or more second optical elements are configured to collimate device light, wherein one or more of the following applies: (i) a primary second optical element is configured between at least one of the one or more light generating devices and the luminescent material, and (ii) a secondary second optical element is configured between the waveplate and the diffuser; and wherein the light generating system is configured to generate system light comprising in the operational mode of the light generating system (i) the diffused device light and (ii) the luminescent material light.

With the invention, high intensity white light may be provided. Furthermore, the invention may enable generation of high intensity light with a reduced risk that such light escapes from the system when an optical component is broken or damaged. Hence, with the proposed system it may be possible to improve the safety of the laser light generating system. In this way, the invention may provide a laser-phosphor based stage lighting engine with a highly efficient polarization maintaining diffuser configuration.

As mentioned before, the invention provides a light generating system comprising, in embodiments, one or more light generating devices, a luminescence conversion arrangement, and a diffuser arrangement. Here below, embodiments of these elements are described in more detail.

In embodiments, the one or more light generating devices may comprise a (solid state) light source, see also further below. Each light generating devices may comprise one or more (solid state) light sources. Especially, the one or more light generating devices may be configured to generate device light. The device light may especially have a wavelength selected from the visible wavelength range, i.e., 380-780 nm. In other embodiments, the device light may also have a wavelength selected from the UV wavelength range. In yet other embodiments, the device light may also have a wavelength selected from the IR wavelength range. Especially, however, the device light has at least 80% of its spectral power in the visible wavelength range, like at least 90%.

The device light may, in an operational mode of the light generating system, propagate through the system. Especially, in embodiments, at least part of the device light may propagate to the luminescence conversion arrangement and at least part of the device light may propagate to the diffuser arrangement. Note that in embodiments the term "luminescence conversion arrangement" may refer to one or more luminescence conversion arrangements. Further, note that the term "diffuser arrangement" may refer to one or more diffuser arrangements.

The at least part of the device light that may propagate to the luminescence conversion arrangement may be converted to luminescent material light. Hence, in embodiments, the luminescence conversion arrangement may comprise a luminescent material. Especially, the luminescent material may be configured to convert at least part of the device light incident on the luminescent material to luminescent material light. Herein, the luminescent material light may especially have a different wavelength from the device light, e.g. the luminescent material light may have a wavelength in the yellow wavelength range and the device light may have a wavelength in the blue wavelength range. Furthermore, in embodiments, the luminescent material may especially be configured in the reflective mode relative to device light irradiating the luminescent material. Especially, in embodiments, the luminescent material may be configured in the reflective mode relative to device light irradiating the luminescent material. Hence, in embodiments, the luminescence conversion arrangement may be configured to provide luminescent material light.

Herein, when an element is indicated to be operated in a transmissive mode this may, in embodiments, imply that at one or more wavelengths the part of the radiation that is transmitted may be larger than the part of the radiation that is reflected or absorbed. Herein, when an element is indicated to be operated in a reflective mode this may in embodiments imply that at one or more wavelengths the part of the radiation that is reflected may be larger than the part of the radiation that is transmitted or absorbed.

Note that when the luminescent material would be damaged or deteriorated, device light will still not directly escape from the system, which may contribute to safety.

In embodiments, the at least part of the device light that may propagate to the diffuser arrangement may especially be polarized light comprising one of a first polarization and a second polarization. Such polarization may be present by nature of the light source or may be imposed by a polarizing optical element. The polarized light may for example have p-polarization or s-polarization, see also further below. In embodiments, the polarization of the device light may be controllable.

Further, in embodiments, the diffuser arrangement may be configured to generate diffused device light from at least part of the device light received by the diffuser arrangement. Hence, to do so, the diffuser arrangement may comprise at least a quarter wave plate, a polarization maintaining diffuser, and a specularly reflective (metallic) mirror.

Further, a polarizing beam splitter may be applied. The polarizing beam splitter may in embodiments be considered comprised by the diffuser arrangement and may in other embodiments be considered configured between the one or more light generating devices and the diffuser arrangement.

Especially, the polarizing beam splitter may be configured between the one or more light generating devices and the quarter wave plate.

In embodiments, the polarizing beam splitter may be configured downstream of the one or more light generating devices. Hence, the polarizing beam splitter may be configured in a light-receiving arrangement with the one or more light generating devices. Especially, the polarizing beam splitter may be transmissive for one of the light having the first polarization and light having the second polarization. Additionally or alternatively, the polarizing beam splitter may be reflective for the other one of the light having the first polarization and light having the second polarization. Thus, for example, in embodiments, the polarizing beam splitter may be transmissive for light having p-polarization and reflective for light having s-polarization. The polarizing beam splitter will be discussed in further embodiments below.

In further embodiments, the quarter wave plate may be configured between the polarizing beam splitter and the polarization maintaining diffuser. Hence, the quarter wave plate may be configured in a light receiving relationship with the polarized light transmitted by the polarizing beam splitter. The quarter wave plate will be discussed in further embodiments below.

In yet further embodiments, the polarization maintaining diffuser (or "diffuser") may be configured between the quarter wave plate and the specularly reflective metallic mirror. Hence, the polarization maintaining diffuser may be configured in a light receiving relationship with the polarized light emanating from the quarter wave plate. Especially, in embodiments, the polarization maintaining diffuser may be configured to diffuse device light, especially device light having a polarization imposed by the quarter wave plate to the device light (see also further below). More especially, the polarization maintaining diffuser may be configured to (substantially) maintain the polarization of the device light incident on the polarization maintaining diffuser. Hence, in embodiments, the polarization maintaining diffuser may generate diffused device light with a maintained polarization. Especially, the polarization maintaining diffuser is transmissive for the device light. Hence, the device light may be transmitted and diffused (especially while essentially maintaining the polarization).

The diffused device light is, in embodiments, transmitted through the polarization maintaining diffuser such, that the diffused device light may be substantially perpendicularly incident on the mirror. Hence, the mirror may specularly reflect at least part of the diffused device light, more especially may reflect essentially all the diffused device light received by the mirror, i.e., the mirror may be reflective for the diffused device light. The reflected diffused device light may propagate back to the wave plate. Instead of the term "mirror" also the term "reflector" may be applied.

In embodiments, the mirror may especially comprise a metallic mirror. The metallic mirror may, in embodiments, comprise a material with at least 80% reflection, such as at least 85%, like at least 90%, including at least 92%, such as at least 95% reflection for the wavelength of the light to be reflected (e.g. light in the blue or red wavelength range). The mirror may, in embodiments, essentially consist of a metallic material. In other embodiment, the mirror may comprise a layer comprising a metallic material (e.g. evaporated onto a substrate by physical vapor deposition (PVD)). The metallic layer may further be protected, e.g., covered by a transparent layer, such as a metal oxide layer (e.g. Aluminum Oxide). Hence, especially, in embodiments, the mirror may comprise one or more materials selected from the group comprising aluminum, gold, copper, and silver Hence, the mirror may comprise a metallic mirror configured to reflect the diffused device light received by the mirror, such that the polarization of the incident diffused device light is reversed.

In embodiments, the quarter wave plate may be configured to convert the diffused device light to diffused device light having the second polarization. Further, the polarizing beam splitter may be configured in a light receiving relationship with the quarter wave plate, such that the diffused device light having the second polarization (imposed by the quarter wave plate) may be reflected by the polarizing beam splitter.

Furthermore, in embodiments, the one or more second optical elements may be configured to collimate device light. More especially, one or more of the following may apply: (i) a primary second optical element may be configured between at least one of the one or more light generating devices and the luminescent material, and (ii) a secondary second optical element may be configured between the quarter waveplate and the diffuser.

The one or more second optical elements may, in embodiments, be one or more second lenses. Especially, the lenses may be configured to collimate the device light and hence to focus the device light. In embodiments, a primary second optical element, e.g. a primary second lens, may be configured in the luminescence conversion arrangement. Especially, the primary second optical element may be configured between at least one of the one or more light generating devices and the luminescent material. In such a configuration, the primary second optical element may especially collimate the device light into a spot on the luminescent material.

In other embodiments, a secondary second optical element, e.g. a secondary second lens, may be configured in the diffuser arrangement. Especially, the secondary second optical element may be configured between the waveplate and the diffuser. In such a configuration, the secondary second optical element may especially collimate the device light into a spot on the diffuser.

In yet other embodiments, the light generating system may comprise both the primary second optical element and the secondary second optical element as described above.

By focusing the device light into a spot on the luminescent material and the diffuser, using the herein described second optical elements, the efficiency of the diffuser arrangement may be improved. In short, the second optical elements may (i) help facilitate similarity among the beams of luminescent material light and diffused device light, and (ii) help ensure the perpendicular incidence of diffused device light onto the mirror.

Hence, in specific embodiments the spot of device light on the luminescent material and the spot of device light on the diffuser may have substantially the same areas. Especially, these areas may be small areas, i.e., these areas may have an equivalent circular diameter of ≤2 mm, such as ≤1 mm. The equivalent circular diameter may be defined perpendicular to an optical axis of the device light propagating to the luminescent body. Especially, the equivalent circular diameter may be at least 10 μm, such as at least 50 μm, like at least 0.1 mm. More especially, the equivalent circular diameter of the spot of device light may be at most 2 mm, such as at most 1 mm, like at most 0.5 mm.

Hence, especially, in embodiments, there may be a non-zero distance between the quarter wave-plate and the polarization maintaining diffuser. Further, in embodiments there may be a non-zero distance between the polarization maintaining diffuser and the mirror. Especially, the non-zero distances may be at least 0.1 mm, especially at least 1 mm or at least 5 mm such as 10 mm. Further, the non-zero distances may be at most 10 cm or at most 15 cm, such as 20 cm.

The polarization maintaining diffuser may diffuse at least part of the device light. Hence, the polarization maintaining diffuser may not only transmit this light, but also scatter. Therefore, the polarization maintaining diffuser is a diffuser.

Hence, in embodiments, the light generating system may be configured to generate system light. Especially, in the operational mode of the light generating system the system light may comprise the diffused device light (reflected by the polarizing beam splitter) and the luminescent material light (generated in the luminescent material).

Here below, some further embodiments in relation to the light generating device are described.

As indicated above, the light generating system comprises a light generating device. A light generating device may especially be configured to generate device light. Especially, the light generating device may comprise a light source. In embodiments, the light generating device may comprise a solid-state light source. Especially, in embodiments, the light generating device may comprise a laser. Especially, in other embodiments, the light generating device may comprise a superluminescent diode. The light source may especially be configured to generate light source light. In embodiments, the device light may essentially consist of the light source light. The term "light generating device" may also refer to a plurality of light generating devices which may provide device light having essentially the same spectral power distributions. In specific embodiments, the term "light generating device" may also refer to a plurality of light generating devices which may provide device light having different spectral power distributions.

The term "light source" may in principle relate to any light source known in the art. It may be a conventional (tungsten) light bulb, a low pressure mercury lamp, a high pressure mercury lamp, a fluorescent lamp, an LED (light emissive diode). In a specific embodiment, the light source comprises a solid state LED light source (such as an LED or laser diode (or "diode laser")). The term "light source" may also relate to a plurality of light sources, such as 2-2000 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light emitting semiconductor light source may be configured on the same substrate. In embodiments, a COB is a multi LED chip configured together as a single lighting module. The light source may have a light escape surface. Referring to conventional light sources such as light bulbs or fluorescent lamps, it may be an outer surface of a glass or a quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

Likewise, a light generating device may comprise a light escape surface, such as an end window. Further, likewise a light generating system may comprise a light escape surface, such as an end window.

The term "light source" may refer to a semiconductor light-emitting device, such as a light emitting diode (LEDs), a resonant cavity light emitting diode (RCLED), a vertical cavity laser diode (VCSELs), an edge emitting laser, etc. . . . . The term "light source" may also refer to an organic light-emitting diode (OLED), such as a passive-matrix (PMOLED) or an active-matrix (AMOLED). In a specific embodiment, the light source comprises a solid-state light source (such as an LED or laser diode). In an embodiment, the light source comprises an LED (light emitting diode). The terms "light source" or "solid state light source" may also refer to a superluminescent diode (SLED).

The term LED may also refer to a plurality of LEDs.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as an LED, or downstream of a plurality of solid-state light sources (i.e. e.g. shared by multiple LEDs). In embodiments, the light source may comprise an LED with on-chip optics. In embodiments, the light source comprises pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as an LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as an LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The light source may especially be configured to generate light source light having an optical axis (O), (a beam shape,)

and a spectral power distribution. The light source light may in embodiments comprise one or more bands, having band widths as known for lasers.

The term “light source” may (thus) refer to a light generating element as such, like e.g. a solid state light source, or e.g. to a package of the light generating element, such as a solid state light source, and one or more of a luminescent material comprising element and (other) optics, like a lens, a collimator. A light converter element (“converter element” or “converter”) may comprise a luminescent material comprising element. For instance, a solid state light source as such, like a blue LED, is a light source. A combination of a solid state light source (as light generating element) and a light converter element, such as a blue LED and a light converter element, optically coupled to the solid state light source, may also be a light source (but may also be indicated as light generating device). Hence, a white LED is a light source (but may e.g. also be indicated as (white) light generating device).

The term “light source” herein may also refer to a light source comprising a solid state light source, such as an LED or a laser diode or a superluminescent diode.

The term “light source” may (thus) in embodiments also refer to a light source that is (also) based on conversion of light, such as a light source in combination with a luminescent converter material. Hence, the term “light source” may also refer to a combination of an LED with a luminescent material configured to convert at least part of the LED radiation, or to a combination of a (diode) laser with a luminescent material configured to convert at least part of the (diode) laser radiation.

In embodiments, the term “light source” may also refer to a combination of a light source, like an LED, and an optical filter, which may change the spectral power distribution of the light generated by the light source. Especially, the term “light generating device” may be used to address a light source and further (optical components), like an optical filter and/or a beam shaping element, etc.

The phrases “different light sources” or “a plurality of different light sources”, and similar phrases, may in embodiments refer to a plurality of solid-state light sources selected from at least two different bins. Likewise, the phrases “identical light sources” or “a plurality of same light sources”, and similar phrases, may in embodiments refer to a plurality of solid-state light sources selected from the same bin.

The term “solid state light source”, or “solid state material light source”, and similar terms, may especially refer to semiconductor light sources, such as a light emitting diode (LED), a diode laser, or a superluminescent diode.

The term “laser light source” especially refers to a laser. Such a laser may especially be configured to generate device light having one or more wavelengths in the UV, visible, or infrared, especially having a wavelength selected from the spectral wavelength range of 200-2000 nm, such as 300-1500 nm. The term “laser” especially refers to a device that emits light through a process of optical amplification based on the stimulated emission of electromagnetic radiation.

Especially, in embodiments the term “laser” may refer to a solid-state laser. In specific embodiments, the terms “laser” or “laser light source”, or similar terms, refer to a laser diode (or diode laser).

Hence, in embodiments the light source comprises a laser light source. In embodiments, the terms “laser” or “solid state laser” or “solid state material laser” may refer to one or more of cesium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride (Sm:CaF2) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate Nd:Yca4O(BO3)3 or Nd:YCOB, neodymium doped yttrium orthovanadate (Nd:YVO4) laser, neodymium glass (Nd:glass) laser, neodymium YLF (Nd:YLF) solid-state laser, promethium 147 doped phosphate glass (147Pm3+:glass) solid-state laser, ruby laser (Al2O3:Cr3+), thulium YAG (Tm:YAG) laser, titanium sapphire (Ti:sapphire; Al2O3:Ti3+) laser, trivalent uranium doped calcium fluoride (U:CaF2) solid-state laser, Ytterbium doped glass laser (rod, plate/chip, and fiber), Ytterbium YAG (Yb:YAG) laser, Yb2O3 (glass or ceramics) laser, etc.

For instance, including second and third harmonic generation embodiments, the light source may comprise one or more of an F center laser, an yttrium orthovanadate (Nd:$YVO_4$) laser, a promethium 147 doped phosphate glass (147$Pm^{3+}$:glass), and a titanium sapphire (Ti:sapphire; $Al_2O_3$:$Ti^{3+}$) laser. For instance, considering second and third harmonic generation, such light sources may be used to generated blue light.

In embodiments, the terms “laser” or “solid state laser” or “solid state material laser” may refer to one or more of a semiconductor laser diodes, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term “laser light source” may also refer to a plurality of (different or identical) laser light sources. In specific embodiments, the term “laser light source” may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light. Hence, in embodiments lasers in a laser bank (or “laser array bank”) may share the same optics.

The laser light source is configured to generate laser light source light (or “laser light”). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The laser light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term “focused” may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially ≤1° (FWHM), most especially ≤0.5° (FWHM). Hence, ≤2° (FWHM) may be considered (highly) collimated light source light. Optics may be used to provide (high) collimation (see also above).

The term “solid state material laser”, and similar terms, may refer to a solid state laser like based on a crystalline or glass body dopes with ions, like transition metal ions and/or lanthanide ions, to a fiber laser, to a photonic crystal laser, to a semiconductor laser, such as e.g. a vertical cavity surface-emitting laser (VCSEL), etc.

The term “solid state light source”, and similar terms, may especially refer to semiconductor light sources, such as a light emitting diode (LED), a diode laser, or a superluminescent diode. Instead of the term “solid state light source” also the term “semiconductor-based light source” may be applied. Hence, the term “semiconductor-based light source” may e.g. refer to one or more of a light emitting diode (LED), a diode laser, and a superluminescent diode. Hence, the light generating device may comprise one or more of a light emitting diode (LED), a diode laser, and a superluminescent diode.

Superluminescent diodes are known in the art. A superluminescent diode may be indicated as a semiconductor device which may be able to emit low-coherence light of a broad spectrum like an LED, while having a brightness in the order of a laser diode.

The beams (of light source light) may be focused or collimated beams of (laser) light source light. The term “focused” may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially ≤1° (FWHM), most especially ≤0.5° (FWHM). Hence, ≤2° (FWHM) may be considered (highly) collimated light source light. Optics may be used to provide (high) collimation (see also above).

The term “solid state material laser”, and similar terms, may refer to a solid state laser like based on a crystalline or glass body dopes with ions, like transition metal ions and/or lanthanide ions, to a fiber laser, to a photonic crystal laser, to a semiconductor laser, such as e.g. a vertical cavity surface-emitting laser (VCSEL), etc.

The term “solid state light source”, and similar terms, may especially refer to semiconductor light sources, such as a light emitting diode (LED), a diode laser, or a superluminescent diode. Instead of the term “solid state light source” also the term “semiconductor-based light source” may be applied. Hence, the term “semiconductor-based light source” may e.g. refer to one or more of a light emitting diode (LED), a diode laser, and a superluminescent diode. Hence, the light generating device may comprise one or more of a light emitting diode (LED), a diode laser, and a superluminescent diode.

Superluminescent diodes are known in the art. A superluminescent diode may be indicated as a semiconductor device which may be able to emit low-coherence light of a broad spectrum like an LED, while having a brightness in the order of a laser diode.

US2020192017 indicates for instance that “With current technology, a single SLED is capable of emitting over a bandwidth of for example, at most 50-70 nm in the 800-900 nm wavelength range with sufficient spectral flatness and sufficient output power. In the visible range used for display applications, i.e. in the 450-650 nm wavelength range, a single SLED is capable of emitting over bandwidth of at most 10-30 nm with current technology. Those emission bandwidths are too small for a display or projector application which requires red (640 nm), green (520 nm) and blue (450 nm), i.e. RGB, emission”. Further, superluminescent diodes are amongst others described, in “Edge Emitting Laser Diodes and Superluminescent Diodes”, Szymon Stanczyk, Anna Kafar, Dario Schiavon, Stephen Najda, Thomas Slight, Piotr Perlin, Book Editor(s): Fabrizio Roccaforte, Mike Leszczynski, First published: 3 Aug. 2020 https://doi.org/10.1002/9783527825264.ch9 in chapter 9.3 superluminescent diodes. This book, and especially chapter 9.3, are herein incorporated by reference. Amongst others, it is indicated therein that the superluminescent diode (SLD) is an emitter, which combines the features of laser diodes and light-emitting diodes. SLD emitters utilize the stimulated emission, which means that these devices operate at current densities similar to those of laser diodes. The main difference between LDs and SLDs is that in the latter case, the device waveguide may be designed in a special way preventing the formation of a standing wave and lasing. Still, the presence of the waveguide ensures the emission of a high-quality light beam with high spatial coherence of the light, but the light is characterized by low time coherence at the same time” and “Currently, the most successful designs of nitride SLD are bent, curved, or tilted waveguide geometries as well as tilted facet geometries, whereas in all cases, the front end of the waveguide meets the device facet in an inclined way, as shown in FIG. 9.10. The inclined waveguide suppresses the reflection of light from the facet to the waveguide by directing it outside to the lossy unpumped area of the device chip”. Hence, an SLD may especially be a semiconductor light source, where the spontaneous emission light is amplified by stimulated emission in the active region of the device. Such emission is called “super luminescence". Superluminescent diodes combine the high power and brightness of laser diodes with the low coherence of conventional light-emitting diodes. The low (temporal) coherence of the source has advantages that the speckle is significantly reduced or not visible, and the spectral distribution of emission is much broader compared to laser diodes, which can be better suited for lighting applications. Especially, with varying electrical current, the spectral power distribution of the superluminescent diode may vary. In this way the spectral power distribution can be controlled, see e.g. also Abdullah A. Alatawi, et al., Optics Express Vol. 26, Issue 20, pp. 26355-26364, https://doi.org/10.1364/OE.26.026355.

Hence, in embodiments, the invention may provide a laser-phosphor based stage lighting engine with a highly efficient polarization maintaining diffuser arrangement (or "configuration").

As mentioned above, the diffuser arrangement may comprise a (specularly reflective metallic) mirror. In embodiments, the mirror may comprise a planar mirror. Especially, in such embodiments, the diffuser arrangement may comprise a first optical element configured between the polarization maintaining diffuser and the (planar) mirror. More especially, the first optical element may be configured to collimate at least part of the diffused device light into a beam perpendicular to the (planar) mirror. In embodiments, the first optical element may especially be configured to collimate essentially all of the diffused device light into a beam perpendicular to the (planar) mirror. In embodiments, the first optical element may especially comprise a lens. Especially, the first optical element may comprise one or more lenses. Hence, in specific embodiments, the mirror comprises a planar mirror, wherein the diffuser arrangement comprises a first optical element, wherein the first optical element is configured between the polarization maintaining diffuser and the mirror, wherein the first optical element is configured to collimate at least part of the diffused device light into a beam perpendicular to the mirror, wherein the first optical element comprises a lens.

In other embodiments, the mirror may comprise a curved mirror. Especially, in embodiments, the mirror may comprise a concave mirror. In such embodiments, at least part of the diffused device light may especially be perpendicularly reflected off the curved mirror. Hence, the curved mirror may have a curved shape selected such that the diffused device light transmitted (and/or scattered) by the diffuser may be perpendicularly incident on the mirror. For example, in embodiments, the curved mirror may have a semicircle shape or a semi-ellipse shape. The person skilled in the art may be able to select a combination of diffuser and curved mirror, taking into account size, shape, and distance, relative to each other, to provide a perpendicular incidence of diffused device light onto the curved mirror.

The device light may comprise different polarizations while propagating through the system. This difference may especially be exploited as the polarizing beam splitter may be configured transmissive for one of the light having the first polarization and light having the second polarization and reflective for the other one of the light having the first polarization and the light having the second polarization.

In embodiments, the first polarization and the second polarization may especially comprise linear polarizations. Especially, in embodiments, polarized light comprising the first polarization may especially comprise one of p-polarization and s-polarization. Further, polarized light comprising the second polarization may especially comprise the other one of p-polarization and s-polarization. Hence, in such embodiments, the first polarization and the second polarization may be exact opposites. In embodiments, the first and second polarization may be (essentially) linear polarizations. For example, in embodiments, the first polarization may comprise at least 80% p-polarized light, such as at least 90% p-polarized light, especially including 100% p-polarized light. Likewise, for example, the second polarization may comprise at least 80% s-polarized light, such as at least 90% s-polarized light, especially including 100% s-polarized light. In specific embodiments, polarized light comprising the first polarization comprises one of p-polarization and s-polarization, and polarized light comprising the second polarization comprises the other one of p-polarization and s-polarization.

For example, in specific embodiments, the first polarization is p-polarization and hence, the second polarization is s-polarization. In other specific embodiments, the first polarization is s-polarization and hence, the second polarization is p-polarization.

Therefore, in embodiments, polarized light comprising first polarization may have the opposite polarization relative to polarized light comprising the second polarization.

The polarization of the device light may essentially not be influenced by the diffuser. Consequently, the diffuser may be a polarization maintaining diffuser. Therefore, in embodiments, the polarization maintaining diffuser may comprise an optically isotropic material. Especially, the polarization maintaining diffuser may comprise a material selected from the group comprising cubic crystals, stress-free glass, and isotropic transparent polymers, such as silicone rubber, PMMA, etc. Furthermore, the polarization maintaining diffuser may comprise a surface relief, i.e., the surface of the polarization maintaining diffuser may comprise a (pseudo-random) microstructure of depressions and elevations.

Herein the term "optically isotropic material" may refer to a material of which the optical properties (i.e., the index of refraction) are the same in all directions. Hence, in embodiments, the index of refraction of light incident on the polarization maintaining diffuser may be independent of the polarization of the light, i.e., the polarization maintaining diffuser may be birefringence-free.

Further especially, the diffuser may maintain the polarization of the light incident on the diffuser. For example, in embodiments where RHC polarized light is incident on the diffuser, the diffuser may emit RHC polarized diffused light. It may be clear that other polarizations may also be maintained in embodiments where the light has another polarization, such as LHC polarization of linear polarization.

Furthermore, the polarization of the (diffused) device light may be influenced by the wave plate comprised by the diffuser arrangement. Especially, in embodiments, the wave plate may comprise a quarter wave plate. More especially, the wave plate may be configured to convert device light having the first polarization to device light having a (first) circular polarization. Further, the wave plate may be configured to convert diffused device light having a (second) circular polarization to diffused device light having the second polarization. Hence, in specific embodiments, the quarter wave plate is configured to convert device light having the first polarization to device light having a circular polarization, and to convert diffused device light having a circular polarization to diffused device light having the second polarization.

Wave plates are known in the art. Especially, the wave plate herein may comprise a birefringent material. More especially, the wave plate may comprise a material selected from the group of a (crystalline) quartz, a mica, a calcite, and a plastic.

As known from the art, a waveplate or retarder is an optical device that alters the polarization state of a light wave travelling through it. A quarter wave plate may convert linearly polarized light into circularly polarized light (and vice versa). Hence, the quarter wave plate may be configured to phase shift the device light, especially to produce a $\lambda/4$ phase shift of the device light.

In specific embodiments, the wave plate may be configured to convert device light having linear p-polarization into circularly polarized light (i.e., right handed (RHC) or left handed (LHC) circularly polarized light). Further, the wave plate may be configured to convert device light having linear s-polarization into circularly polarized light (i.e., right handed (RHC) or left handed (LHC) circularly polarized light). Yet further, the wave plate may be configured to convert diffused device light having LHC polarization into linearly polarized light (i.e., p-polarized or s-polarized light). Yet further, the wave plate may be configured to convert diffused device light having RHC polarization into linearly polarized light (i.e., p-polarized or s-polarized light). Hence, the light generating system may comprise a wave plate to manipulate the device light. Furthermore, the light generating system may (also) comprise a dichroic reflector to manipulate the device light.

As described above, the specularly reflective metallic mirror may reverse the polarization of the diffused device light. Especially, circular polarized light of a first type may be converted into reflected circular polarized light of a second type. The first and second type may be selected from left handed and right handed circular polarized light. See further also below.

Therefore, in embodiments one of the following may apply: (i) the polarizing beam splitter may be configured to transmit the device light having the first linear polarization; the quarter wave plate may be configured to convert transmitted device light having the first linear polarization into first circularly polarized light having a first handedness; the specularly reflective metallic mirror may be configured to reflect the first circularly polarized light having the first handedness into second circularly polarized light having a second handedness; the quarter wave plate may be configured to convert second circularly polarized light having the second handedness into device light having a second linear polarization, wherein the device light having the second linear polarization is 90° rotated with respect to the device light having the first linear polarization; the polarizing beam splitter may be configured to reflect the device light having the second linear polarization; (ii) the polarizing beam splitter may be configured to reflect the device light having the first linear polarization; the quarter wave plate may be configured to convert reflected device light having the first linear polarization into first circularly polarized light having a first handedness; the specularly reflective metallic mirror may be configured to reflect the first circularly polarized light having the first handedness into second circularly polarized light having a second handedness; the quarter wave plate may be configured to convert second circularly polarized light having the second handedness into device light having the second linear polarization, wherein the device light having the second linear polarization is 90° rotated with respect to the device light having the first linear polarization; and the polarizing beam splitter may be configured to transmit the device light having the second linear polarization.

Further, a dichroic reflector may be applied. The dichroic reflector may in embodiments be considered comprised by the luminescence conversion arrangement and may in other embodiments be considered configured between the one or more light generating devices and the luminescence conversion arrangement. Especially, the dichroic reflector may be configured between the one or more light generating devices and the luminescent material. Furthermore, in embodiments, the primary second optical element (as described above) may be configured between the dichroic reflector and the luminescent material.

Hence, in embodiments the luminescence conversion arrangement may comprise a dichroic reflector (or "dichroic") configured downstream of one or more of the one or more light generating devices. Especially, the dichroic reflector may be configured to transmit (or reflect) device light and to reflect (or transmit) luminescent material light. Hence, in specific embodiments, the luminescence conversion arrangement further comprises a dichroic reflector configured downstream of one or more of the light generating devices, wherein the dichroic reflector is configured to transmit device light and to reflect luminescent material light.

The dichroic may especially be configured in a light receiving relationship with one or more of the one or more light generating devices and the luminescent material, i.e., the dichroic may be configured to receive at least part of the (blue) device light and at least part of the luminescent material light. The dichroic may especially provide a controllable and wavelength-dependent modification of light provided to the dichroic. For example, in embodiments, the dichroic may be configured to transmit light in the blue wavelength range and to reflect light in the yellow wavelength range. In specific embodiments, the dichroic may be configured to transmit device light (having a wavelength in the blue wavelength range) and to reflect luminescence material light (having a wavelength in the yellow-orange wavelength range). However, in other specific embodiments, the dichroic may be configured to reflect device light (having a wavelength in the blue wavelength range) and to transmit luminescence material light (having a wavelength in the yellow-orange wavelength range).

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

As mentioned above, the light generating system may comprise one or more light generating devices configured to provide device light to the luminescence conversion arrangement and the diffuser arrangement. Hence, in embodiments, the light generating system may comprise multiple light generating devices.

In embodiments, the one or more light generating devices may comprise a first light generating device and a second light generating device. Especially, the first light generating device may be configured to generate first device light and the second light generating device may be configured to generate second device light. Further, in embodiments, the luminescence conversion arrangement may be configured in a light-receiving arrangement with the first light generating device. Furthermore, in embodiments, the diffuser arrangement may be configured in a light-receiving arrangement with the second light generating device. Yet further, in embodiments, the light generating system may comprise a control system configured to control the first light generating device and the second light generating device. Hence, in specific embodiments, the one or more light generating devices comprise a first light generating device and a second light generating device, wherein the first light generating device is configured to generate first device light, wherein the second light generating device is configured to generate second device light, wherein the luminescence conversion arrangement is configured in a light-receiving relationship with the first light generating device, wherein the diffuser arrangement is configured in a light-receiving relationship with the second light generating device.

In such embodiments, the luminescent material may especially be configured to convert at least part of the first device light received by the luminescent material into luminescent material light. Further, in such embodiments the diffuser arrangement may especially be configured to generate diffused device light from at least part of the second device light received by the diffuser arrangement. Hence, in such embodiments the diffused device light may also be indicated as "diffused second device light".

In embodiments, the light generating system may comprise one or more first light generating devices. Hence, the one or more first light generating devices may be configured to generate the first device light. The one or more first light generating devices may, in embodiments, especially comprise one or more first lasers. More especially, in embodiments, the one or more first light generating devices may comprise one or more first lasers in a laser bank. In other embodiments, the one or more first light generating devices may comprise one or more first superluminescent diodes.

Further, the one or more first light generating devices may especially be configured to provide first device light to the luminescence conversion arrangement. Hence, in embodiments, the luminescence conversion arrangement may be configured in a light-receiving relationship with the one or more first light generating devices. Especially, the dichroic reflector may be configured in a light-receiving relationship with the one or more first light generating devices.

Likewise, in embodiments, the light generating system may comprise one or more second light generating devices. Especially, in embodiments, the one or more second light generating devices may comprise one or more second lasers in a laser bank. Hence, the one or more second light generating devices may be configured to generate the second device light. The one or more second light generating devices may, in embodiments, especially comprise one or more second lasers. More especially, in embodiments, the one or more second light generating devices may comprise one or more second lasers in a laser bank. In other embodiments, the one or more second light generating devices may comprise one or more second superluminescent diodes.

Further, the one or more second light generating devices may especially be configured to provide second device light to the diffuser arrangement. Hence, in embodiments, the diffuser arrangement may be configured in a light-receiving arrangement with the one or more second light generating devices. Especially, the polarizing beam splitter may be configured in a light-receiving relationship with the one or more second light generating devices.

In the embodiments as described above, the first device light and the second device light may especially be light in the blue wavelength range. Such a system of using separate (blue) light generating devices for providing light to the luminescence conversion arrangement and providing light to the diffuser arrangement may be beneficial as it may allow for tunability of the light specifically tailored for the target arrangement. Especially, the one or more first light generating devices may be configured such that the first device light may have an optimized luminance for improving the luminous output of the luminescent material light part of the system light. Additionally or alternatively, the one or more second light generating devices may be configured such that the second device light may have an optimized blue color point for improving the spectral power distribution of the system light.

To enable such optimizations, a control system may be desired. Hence, the system may comprise a control system or may be functionally coupled to a control system. The control system may especially be configured to control the light generating system. For instance, the control system may control the light generating system in dependence of a sensor signal, a time scheme (or timer), or a user input (signal).

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions from a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, Thread, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

In specific embodiments, the control system may be configured to control the first light generating device and the second light generating device.

As described above, the light generating system may comprise a first light generating device and a second light generating device. However, in other embodiments, the light generating system may also comprise only one (type of) light generating device. In such embodiments, the light generating system may further comprise a beam splitter configured downstream of the light generating device, and especially upstream of both the luminescence conversion arrangement and the diffuser arrangement. In specific embodiments, the beam splitter may be the polarizing beam splitter comprised by the diffuser arrangement. In other embodiments, the beam splitter may be a half-silvered mirror. The half-silvered mirror may be configured to (i) transmit at least part of the device light to the diffuser arrangement, and to (ii) reflect at least another part of the device light to a third optical element. Especially, the third optical element may be configured to reflect the device light, such that the device light propagates to the luminescent material comprised by the luminescence conversion arrangement. More especially, the third optical element may be a reflector, such as a mirror or a dichroic reflector.

Hence, the beam splitter may be configured to direct at least part of the device light to the luminescence conversion arrangement and to direct at least another part of the device light to the diffuser arrangement. Especially, in embodiments, the beam splitter may (i) transmit light having the first polarization, and (ii) reflect light having the second polarization. In such embodiments, the beam splitter may direct light having the first polarization to the diffuser arrangement, while directing light having the second polarization to the luminescence conversion arrangement.

As the light generating system comprises a luminescence conversion arrangement comprising a luminescent material, the light generating system may generate heat. Such heat may have a negative effect on the e.g. the performance of the luminescent material. Hence, in embodiments, the light generating system may comprise a rotatable device. Especially, the rotatable device may comprise one of the group comprising as a phosphor wheel and a phosphor rod. Especially, the rotatable device may be configured to support the luminescent material. More especially, the rotatable device may be configured to support a ring of luminescent material.

Further, in embodiments, the rotatable device may comprise a thermally conductive material, i.e., may comprise a heat sink or may thermally conduct heat to a heat sink. Hence, the luminescent material, e.g. configured on a phosphor wheel, may be configured in thermal contact with the thermally conductive material. However, in embodiments without a phosphor wheel, also a thermally conductive material, may be configured in thermal contact with the luminescent material. For instance, in embodiments the luminescent material may be configured in physical contact with the thermally conductive material.

Embodiments of the light generating system comprising such a rotatable device as described herein may be beneficial as the luminescent material may be rotated providing sections of the luminescent material with alternating periods of illumination and periods of cooling.

Especially, the luminescent material is comprised by a luminescent body. The luminescent body may be a layer, like a self-supporting layer. The luminescent body may also be a coating. The luminescent body may also comprise a luminescent coating on a support (especially a light transmissive support in the transmissive mode, or a reflective support in the reflective mode). Especially, the luminescent body may essentially be self-supporting. In embodiments, the luminescent material may be provided as luminescent body, such as a luminescent single crystal, a luminescent glass, or a luminescent ceramic body. Such body may be indicated as "converter body" or "luminescent body". In embodiments, the luminescent body may be a luminescent single crystal or a luminescent ceramic body. For instance, in embodiments a cerium comprising garnet luminescent material may be provided as a luminescent single crystal or as a luminescent ceramic body. In other embodiments, the luminescent body may comprise a light transmissive body, wherein the luminescent material is embedded. For instance, the luminescent body may comprise a glass body, with luminescent material embedded therein. Or, the glass as such may be luminescent. In other embodiments, the luminescent body may comprise a polymeric body, with luminescent material embedded therein.

Especially, the luminescent body may be configured in the reflective mode. In the reflective mode, thermal management may be easier, as a substantial part of the luminescent material may be in thermal contact with a thermally conductive element, like a heatsink or heat spreader. In embodiments, the luminescent body may be configured on a rotatable device as described above. Hence, the luminescent body may be comprised by a phosphor wheel or phosphor rod.

The luminescent material may be provided as luminescent body. Hence, the system may comprise a luminescent body comprising the luminescent material.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence.

The term "luminescent material" may also refer to a plurality of different luminescent materials. Examples of possible luminescent materials are indicated below. Hence, the term "luminescent material" may in specific embodiments also refer to a luminescent material composition. Instead of the term "luminescent material" also the term "phosphor" may be applied. These terms are known to the person skilled in the art.

In embodiments, luminescent materials are selected from garnets and nitrides, especially doped with trivalent cerium or divalent europium, respectively. The term "nitride" may also refer to oxynitride or nitridosilicate, etc. Alternatively or additionally, the luminescent material(s) may be selected from silicates, especially doped with divalent europium.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B may comprise aluminum (Al); however, in addition to aluminum, B may also partly comprise gallium (Ga) and/or scandium (Sc) and/or indium (In), especially up to about 20% of B, more especially up to about 10% of B (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein x1+x2+x3=1, wherein x3>0, wherein 0<x2+x3≤0.2, wherein y1+y2=1, wherein 0≤y2≤0.2, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially x1>0, such as >0.2, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (optionally in combination with (the) light of other sources of light as described herein). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein 0<x2+x3≤0.1, and wherein 0≤y2≤0.1. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein x1+x3=1, and wherein 0<x3≤0.2, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga, In and Sc, wherein x1+x2+x3=1, wherein x3>0, wherein 0<x2+x3≤0.2, wherein y1+y2=1, wherein 0≤y2≤0.2. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

Alternatively or additionally, wherein the luminescent material may comprises a luminescent material of the type $A_3Si_6N_{11}:Ce^{3+}$, wherein A comprises one or more of Y, La, Gd, Tb and Lu, such as in embodiments one or more of La and Y.

In embodiments, the luminescent material may alternatively or additionally comprise one or more of $MS:Eu^{2+}$ and/or $M_2Si_5N_8:Eu^{2+}$ and/or $MalSiN_3:Eu^{2+}$ and/or $Ca_2AlSi_3O_2N_5:Eu^{2+}$, etc., wherein M comprises one or more of Ba, Sr and Ca, especially in embodiments at least Sr. Hence, in embodiments, the luminescent may comprise one or more materials selected from the group consisting of (Ba,Sr,Ca)S:Eu, (Ba,Sr,Ca)$AlSiN_3$:Eu and (Ba,Sr,Ca)$_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material (Ba,Sr,Ca)$_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca). Likewise, the material (Ba,Sr,Ca)$AlSiN_3$:Eu can also be indicated as $MalSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, (Ba,Sr,Ca)AlSiN3:Eu and (Ba,Sr, Ca)2Si5N8:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by Eu2+). For instance, assuming 2% Eu in CaAlSiN3:Eu, the correct formula could be (Ca0.98Eu0.02)AlSiN3. Divalent europium will in general replace divalent cations, such as the above divalent alkaline earth cations, especially Ca, Sr or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material (Ba,Sr,Ca)2Si5N8:Eu can also be indicated as M2Si5N8:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as Ba1.5Sr0.5Si5N8:Eu (i.e. 75% Ba; 25% Sr). Here, Eu is introduced and replaces at least part of M, i.e. one or more of Ba, Sr, and Ca).

Likewise, the material (Ba,Sr,Ca)AlSiN3:Eu can also be indicated as MalSiN3:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO (Y2SiO5:Ce3+), or similar compounds, or BAM (BaMgAl10O17:Eu2+), or similar compounds.

A red luminescent material that may (also) be applied may comprise $M'_xM_{2-2x}AX_6$ doped with tetravalent manganese, wherein M' comprises an alkaline earth cation, wherein M comprises a cation, and x is in the range of 0-1, wherein A comprises a tetravalent cation, wherein X comprises a monovalent anion, at least comprising fluorine.

The term "luminescent material" herein especially relates to inorganic luminescent materials.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term “quantum confinement structures” should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

In embodiments, the luminescent material may comprise a first luminescent material configured to generate first luminescent material light. More especially, the first luminescent material may be configured to generate first luminescent material light having a spectral power at one or more wavelengths in the green-yellow wavelength range. Hence, in embodiments, the device light may at least comprise blue light and the luminescent material may be configured to convert the blue device light into green-yellow luminescent material light, such as yellow luminescent material light. Furthermore, the first luminescent material may be of the type $A_3B_5O_{12}$:Ce. Especially, A may comprise one or more of Y, La, Gd, Tb and Lu, and B may comprise one or more of Al, Ga, In and Sc. Hence, in specific embodiments, the device light at least comprises blue light; wherein the luminescent material comprises a first luminescent material configured to generate first luminescent material light having spectral power at one or more wavelengths in the green-yellow wavelength range; wherein the first luminescent material is of the type $A_3B_5O_{12}$:Ce, wherein A comprises one or more of Y, La, Gd, Tb and Lu, and wherein B comprises one or more of Al, Ga, In and Sc.

Hence, in embodiments, the first luminescent material may be configured to generate first luminescent material light having a spectral power at one or more wavelengths in the green-yellow wavelength range.

In further embodiments, the luminescent material may comprise a second luminescent material. Especially, the second luminescent material may be configured to convert at least part of the (blue) device light into second luminescent material light having a different spectral power distribution from the first luminescent material light. More especially, the second luminescent material light may have spectral power at one or more wavelengths in the orange-red wavelength range. Hence, in specific embodiments, the light generating system comprises a second luminescent material configured to convert at least part of the device light into second luminescent material light having a spectral power distribution different from the first luminescent material light, wherein the second luminescent material light has spectral power at one or more wavelengths in the orange-red wavelength range. Especially, in embodiments, the second luminescent material may (also) be of the type $A_3B_5O_{12}$:Ce, wherein A comprises one or more of Y, La, Gd, Tb and Lu, and wherein B comprises one or more of Al, Ga, In and Sc. Hence, the second luminescent material may comprise a material as described above. However, the first luminescent material and the second luminescent material may be different, i.e., the first luminescent material and the second luminescent material may be selected such that the first luminescent material light and the second luminescent material light may have different spectral power distributions. For instance, the first luminescent material light and the second luminescent material light may differ in color point.

In specific embodiments, colors or color points of a first type of light and a second type of light may be different when the respective color points of the first type of light and the second type of light differ with at least 0.01 for u' and/or with at least 0.01 for v', even more especially at least 0.02 for u' and/or with at least 0.02 for v'. In yet more specific embodiments, the respective color points of first type of light and the second type of light may differ with at least 0.03 for u' and/or with at least 0.03 for v'. Here, u' and v' are color coordinates of the light in the CIE 1976 UCS (uniform chromaticity scale) diagram. Spectral power distributions of different sources of light having centroid wavelengths differing least 10 nm, such as at least 20 nm, or even at least 30 nm may be considered different spectral power distributions, e.g. different colors. In general, the differences in centroid wavelengths will not be larger than about 400 nm, such as not more than 350 nm.

For instance, in embodiments, the light generating system may comprise a first luminescence conversion arrangement (configured to generate luminescent material light having a wavelength in the green-yellow wavelength range) and a second luminescence conversion arrangement (configured to generate second luminescent material light having a wavelength in the orange-red wavelength range).

In other embodiments, the light generating system may comprise a single luminescence conversion arrangement comprising a first luminescent material and a second luminescent material. Especially, in embodiments, the luminescence conversion arrangement may comprise a rotatable device configured to support the luminescent material (e.g., a ring of luminescent material). For example, in embodiments, the luminescent material may comprise (a ring comprising) alternating sections of first luminescent material and second luminescent material. In other embodiments, the luminescent material may comprise a first ring of first luminescent material with a second concentric ring of second luminescent material. In yet other embodiments, the luminescent material may comprise a mix of the first luminescent material and the second luminescent material.

Note that the term “second luminescent material” may refer to a single type of luminescent material but may in specific embodiments also refer to two or more different types of (second) luminescent materials.

Hence, in embodiments, the luminescence conversion arrangement may comprise two luminescent materials. Furthermore, the luminescence conversion arrangement may comprise two or more luminescent materials. Especially, the two or more luminescent materials may be selected from the group comprising a yellow luminescent material, a red luminescent material, and a green luminescent material. More especially, in embodiments, the two or more luminescent materials may be supported by, e.g., a phosphor wheel. In such embodiments, the two or more luminescent materials may be in thermal contact with the phosphor wheel.

Similar to how the light generating system may comprise one or more luminescence conversion arrangements, the light generating system may (also) comprise one or more diffuser arrangements.

In embodiments, the light generating system may comprise a first diffuser arrangement and a second diffuser arrangement. The diffuser arrangements have been described in more detail above. Furthermore, the one or more light generating devices may comprise a first light generating device, a second light generating device and a third light generating device. Especially, the first light generating device may be configured to generate first device light. More especially, the first device light may have a wavelength in the blue wavelength range. Further, the second light generating device may be configured to generate second device light. Especially, the second device light may (also) have a wavelength in the blue wavelength range. Yet further, the third light generating device may be configured to generate third device light. Especially, the third device light may have a wavelength in the red wavelength range. In embodiments, the luminescence conversion arrangement may be configured in a light-receiving relationship with the first light generating device (and convert at least part of the first device light in luminescent material light), and may be configured to provide (yellow-green) luminescent material light. Further, in embodiments, the first diffuser arrangement may be configured in a light-receiving relationship with the second light generating device (and generate at least part of the diffused (second) device light). As described above, the luminescence conversion arrangement and the first diffuser arrangement may be configured to generate luminescent material light and diffused (second) device light. Yet further, in embodiments, the second diffuser arrangement may be configured in a light-receiving relationship with the third light generating device (and generate at least part of the diffused (third) device light). Especially, the second diffuser arrangement may be configured to generate diffused third device light from at least part of the third device light received by the second diffuser arrangement. Hence, in such embodiments, the light generating system may be configured to generate system light comprising in the operational mode of the light generating system (i) the diffused device light, (ii) the luminescent material light, and (iii) the diffused third device light. In such embodiments, the light generating system may further comprise a control system (as described above) configured to control the first, second, and third light generating devices. Hence, in specific embodiments, the light generating system comprises a first diffuser arrangement and a second diffuser arrangement, wherein the one or more light generating devices comprise a first light generating device, a second light generating device, and a third light generating device, wherein the first light generating device is configured to generate first device light, wherein the second light generating device is configured to generate second device light, wherein the third light generating device is configured to generate third device light; wherein the luminescence conversion arrangement is configured in a light-receiving relationship with the first light generating device, and is configured to provide luminescent material light; wherein the first diffuser arrangement is configured in a light-receiving relationship with the second light generating device; wherein the second diffuser arrangement is configured in a light-receiving relationship with the third light generating device; wherein the second diffuser arrangement is configured to generate diffused third device light from at least part of the third device light received by the second diffuser arrangement; wherein the light generating system is configured to generate system light comprising in the operational mode of the light generating system (i) the diffused (second) device light, (ii) the luminescent material light, and (iii) the diffused (third) device light.

Hence, in embodiments, the first diffuser arrangement may be configured to generate blue diffused (first) device light. Further, in such embodiments, the second diffuser arrangement may be configured to generate red diffused (third) device light. Hence, the light generating system may generate white system light comprising (i) blue diffused (first) device light, (ii) green-yellow luminescent material light, and (iii) red diffused (third) device light.

Furthermore, it may be possible to generate white light with solely diffuser arrangements, i.e., without the use of a luminescence conversion arrangement. For example, in embodiments, the light generating system may comprise a first diffuser arrangement, a second diffuser arrangement, and a third diffuser arrangement, configured in an RGB configuration. Such embodiments may be beneficial as the heat generation of the luminescent material and the bulk of a phosphor wheel may be omitted.

Hence, in embodiments, an alternative light generating system may comprise a first diffuser arrangement, a second diffuser arrangement, and a third diffuser arrangement as described above. In short, especially, the alternative light generating system may comprise a first light generating device, configured to provide first device light, having a wavelength in the blue wavelength range, to the first diffuser arrangement. The first diffuser arrangement may, in embodiments, convert the blue first device light into blue diffused (first) device light.

Further, the alternative light generating system may comprise (one or more of) a second light generating device, configured to provide second device light, having a wavelength in the red wavelength range, to the second diffuser arrangement. The second diffuser arrangement may, in embodiments, convert the red second device light into red diffused second device light.

Yet further, the alternative light generating system may comprise (one or more of) a third light generating device, configured to provide third device light, having a wavelength in the green wavelength range, to the third diffuser arrangement. The third diffuser arrangement may, in embodiments, convert the green third device light into green diffused third device light.

Hence, in embodiments, the alternative light generating system may be configured to generate white system light comprising, in the operational mode of the alternative light generating system, the blue first, red second, and third green diffused device light.

In the present invention, however, the system light may comprise at least the luminescent material light and the diffused device light. In embodiments, the system light may in the operational mode of the light generating system especially comprise white light. Especially, the system light may comprise white light having a correlated color temperature in a range from 1800-10000 K, such as 7000-10000, like 2000-10000 K, and a color rendering index of at least 70, more especially at least 80. Hence, in embodiments, the system light may comprise, in the operational mode of the light generating system, white light having a correlated color temperature in a range from 2000 K to 10000 K and a color rendering index of at least 80. In specific embodiments, the CCT may be selected from the range of 2000-6500 K, such as selected from the range of 2700-6500 K.

The term "white light", and similar terms, herein, are known to the person skilled in the art. They may especially relate to light having a correlated color temperature (CCT) between about 1800 K and 20000 K, such as between 2000 and 20000 K, especially 2700-20000 K, for general lighting especially in the range of about 2000-7000 K, such as in the range of 2700 K and 6500 K. In embodiments, e.g. for backlighting purposes, or for other purposes, the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

In specific embodiments, the correlated color temperature (CCT) may be selected from the range of 6000-12000 K, like selected from the range of 7000-12000 K, like at least 8000 K. Yet further, in embodiments the correlated color temperature (CCT) may be selected from the range of 6000-12000 K, like selected from the range of 7000-12000 K, in combination with a CRI of at least 70. In specific embodiments, the correlated color temperature (CCT) may be selected from the range of 2000-10000 K, in combination with a color rendering index (CRI) of at least 70, such as at least 80.

In another aspect of the invention, the invention provides a diffuser arrangement (as such), wherein the diffuser arrangement comprises a polarizing beam splitter, a quarter wave plate, a polarization maintaining diffuser, and a specularly reflective mirror, wherein the mirror comprises a metallic mirror; and wherein the diffuser arrangement comprises a secondary second optical element, wherein the secondary second optical elements is configured between the quarter wave plate and the polarization maintaining diffuser.

The polarizing beam splitter, the quarter wave plate, the polarization maintaining diffuser, and the specularly reflective metallic mirror have been described in more detail above.

In specific embodiments, the mirror comprises a planar mirror, wherein the diffuser arrangement comprises a first optical element, wherein the first optical element is configured between the polarization maintaining diffuser and the mirror, wherein the first optical element is configured to collimate at least part of the diffused device light into a beam perpendicular to the mirror, wherein the first optical element comprises a lens (or even one or more lenses).

In other specific embodiments, the mirror comprises a curved mirror, wherein at least part of the diffused device light is perpendicularly reflected off the curved mirror. The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

The terms "visible", "visible light" or "visible emission" and similar terms refer to light having one or more wavelengths in the range of about 380-780 nm. Herein, UV may especially refer to a wavelength selected from the range of 190-380 nm, such as 200-380 nm. The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

The terms "violet light" or "violet emission", and similar terms, may especially relate to light having a wavelength in the range of about 380-440 nm. In specific embodiments, the violet light may have a centroid wavelength in the 380-440 nm range. The terms "blue light" or "blue emission", and similar terms, may especially relate to light having a wavelength in the range of about 440-490 nm (including some violet and cyan hues). In specific embodiments, the blue light may have a centroid wavelength in the 440-490 nm range. The terms "green light" or "green emission", and similar terms, may especially relate to light having a wavelength in the range of about 490-560 nm. In specific embodiments, the green light may have a centroid wavelength in the 490-560 nm range. The terms "yellow light" or "yellow emission", and similar terms, may especially relate to light having a wavelength in the range of about 560-590 nm. In specific embodiments, the yellow light may have a centroid wavelength in the 560-590 nm range. The terms "orange light" or "orange emission", and similar terms, may especially relate to light having a wavelength in the range of about 590-620 nm. In specific embodiments, the orange light may have a centroid wavelength in the 590-620 nm range. The terms "red light" or "red emission", and similar terms, may especially relate to light having a wavelength in the range of about 620-750 nm. In specific embodiments, the red light may have a centroid wavelength in the 620-750 nm range. The terms "cyan light" or "cyan emission", and similar terms, especially relate to light having a wavelength in the range of about 490-520 nm. In specific embodiments, the cyan light may have a centroid wavelength in the 490-520 nm range. The terms "amber light" or "amber emission", and similar terms, may especially relate to light having a wavelength in the range of about 585-605 nm, such as about 590-600 nm. In specific embodiments, the amber light may have a centroid wavelength in the 585-605 nm range. The phrase "light having one or more wavelengths in a wavelength range" and similar phrases may especially indicate that the indicated light (or radiation) has a spectral power distribution with at least intensity or intensities at these one or more wavelengths in the indicate wavelength range. For instance, a blue emitting solid state light source will have a spectral power distribution with intensities at one or more wavelengths in the 440-495 nm wavelength range.

The term "centroid wavelength", also indicated as kc, is known in the art, and refers to the wavelength value where half of the light energy (of a band in a wavelength spectrum) is at shorter and half the energy is at longer wavelengths; the value is stated in nanometers (nm). It is the wavelength that divides the integral of a spectral power distribution into two equal parts as expressed by the formula $\lambda c=\Sigma\lambda*I(\lambda)/(\Sigma I(\lambda))$, where the summation is over the wavelength range of interest, and $I(\lambda)$ is the spectral intensity or energy density (i.e. the integration of the product of the wavelength and the intensity over the emission band normalized to the integrated intensity). The centroid wavelength may e.g., be determined at operation conditions.

In yet a further aspect, the invention also provides a lamp or a luminaire comprising the light generating system as defined herein. The luminaire may further comprise a housing, optical elements, louvres, etc. etc. . . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g., a projection screen. The projection device may include one or more light generating systems such as described herein. In yet a further aspect, the invention also provides a stage-lighting device comprising the light generating system as defined herein. Especially, a stage-lighting device may be an optical device that provides high performance white light onto a surface, such as a stage or a dance floor. Hence, in an aspect the invention also provides a light generating device selected from the group of a lamp, a luminaire, a projector device, and a stage-lighting device, comprising the light generating system as defined herein. The lighting device may comprise a housing or a carrier, configured to house or support, one or more elements of the light generating system. For instance, in embodiments the lighting device may comprise a housing or a carrier, configured to house or support one or more of the one or more light generating device, the luminescence conversion arrangement, and the diffuser arrangement.

Instead of the terms "lighting device" or "lighting system", and similar terms, also the terms "light generating device" or "light generating system", (and similar terms), may be applied. A lighting device or a lighting system may be configured to generate device light (or "lighting device light") or system light ("or lighting system light"). As indicated above, the terms light and radiation may interchangeably be used.

The lighting device may comprise a light source. The device light may in embodiments comprise one or more of light source light and converted light source light (such as luminescent material light).

The lighting system may comprise a light source. The system light may in embodiments comprise one or more of light source light and converted light source light (such as luminescent material light).

The term UV radiation may in specific embodiments refer to near UV radiation (NUV). Therefore, herein also the term "(N)UV" is applied, to refer to in general UV, and in specific embodiments to NUV. The term IR radiation may in specific embodiments refer to near IR radiation (NIR). Therefore, herein also the term "(N)IR" is applied, to refer to in general IR, and in specific embodiments to NIR.

Herein, UV (ultraviolet) may especially refer to a wavelength selected from the range of 190-380 nm, though in specific embodiments other wavelengths may also be possible.

Herein, IR (infrared) may especially refer to radiation having a wavelength selected from the range of 780-3000 nm, such as 780-2000 nm, e.g. a wavelength up to about 1500 nm, like a wavelength of at least 900 nm, though in specific embodiments other wavelengths may also be possible.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
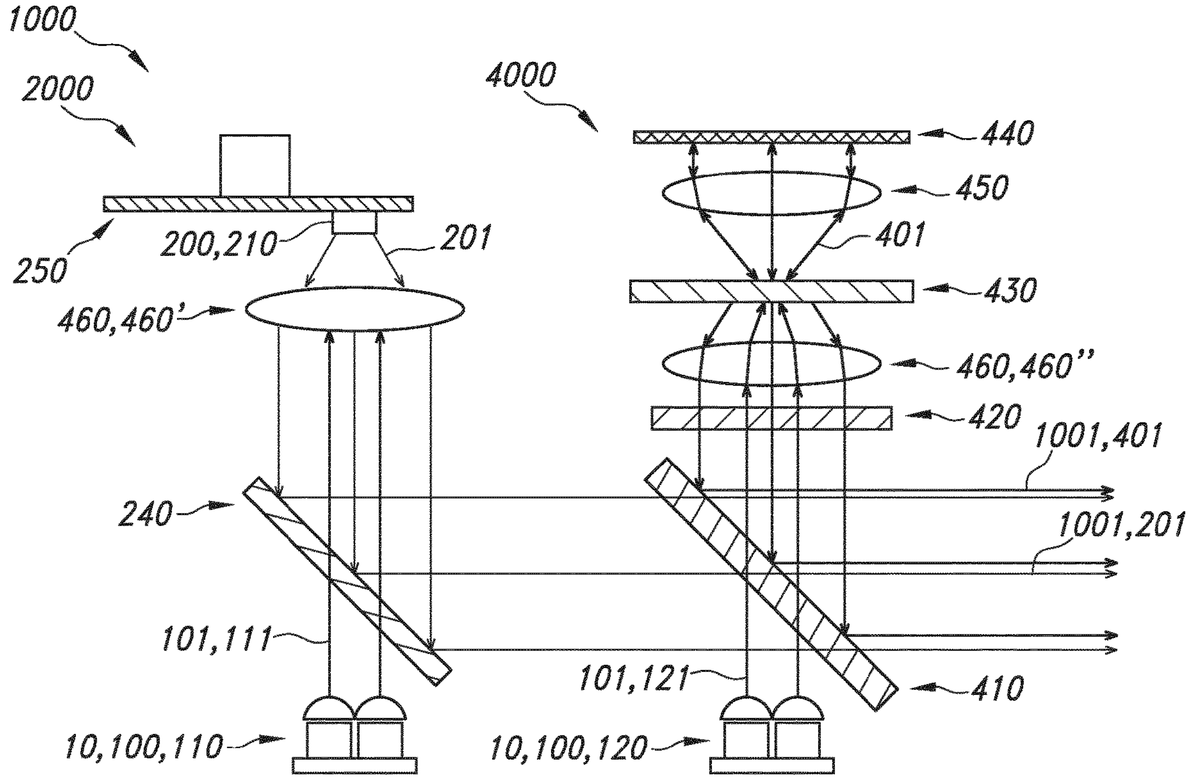
FIGS. 1*a*-3 schematically depict embodiments of the light generating system 1000 and some general aspects.

FIG. 1*a*-*ab* schematically depicts some embodiments of the invention. In embodiments, the invention provides a light generating system ("system") 1000 comprising one or more light generating devices 100, a luminescence conversion arrangement 2000, and a diffuser arrangement 4000. The one or more light generating devices 100 may especially be configured to generate device light 101. Especially, the one or more light generating devices 100 may comprise a solid state light source 10. More especially, the solid state light source 10 may comprise one or more of a laser diode and a superluminescent diode.

Further, in embodiments, the light generating system 1000 may be configured such that in an operational mode of the light generating system 1000, (a) at least part of the device light 101 propagates to the luminescence conversion arrangement 2000, and (b) at least part of the device light 101 propagates to the diffuser arrangement 4000. Especially, the at least part of the device light 101 propagating to the diffuser arrangement 4000 is polarized light comprising one of a first polarization and a second polarization. Further, the luminescence conversion arrangement 2000 may, in embodiments, comprise a luminescent material 200 configured to convert at least part of the device light 101 received by the luminescent material 200 into luminescent material light 201. Especially, the luminescent material 200 may be configured in the reflective mode relative to device light 101 irradiating the luminescent material 200.

Yet further, the diffuser arrangement 4000 may be configured to generate diffused device light 401 from at least part of the device light 101 received by the diffuser arrangement 4000. Therefore, the diffuser arrangement 4000 may comprise a polarizing beam splitter 410, a quarter wave plate 420, a polarization maintaining diffuser 430, and a mirror 440. Herein, the mirror 440 may especially be a specularly reflective (metallic) mirror 440. Furthermore, the polarizing beam splitter 410 may be (i) transmissive for one of the light having the first linear polarization and light having the second linear polarization and (ii) reflective for the other one of the light having the first linear polarization and the light having the second linear polarization. In embodiments, the quarter wave plate 420 may be configured between the polarizing beam splitter 410 and the polarization maintaining diffuser 430. Further, in embodiments, the polarization maintaining diffuser 430 may be configured between the quarter wave plate 420 and the specularly reflective metallic mirror 440. Especially, the polarization maintaining diffuser 430 may be configured as a diffuser for device light 101 having a polarization imposed by the quarter wave plate 420 to the device light 101.

The light generating system 1000 may especially be configured to generate system light 1001 comprising in the operational mode of the light generating system the diffused device light 401 and the luminescent material light 201.

As depicted in FIG. 1A, in some embodiments, the mirror 440 may comprise a planar mirror 440. Especially, in such embodiments, the diffuser arrangement 4000 may comprise a first optical element 450 configured between the polarization maintaining diffuser 430 and the planar mirror 440. More especially, the first optical element 450 may be configured to collimate at least part of the diffused device light 401 into a beam perpendicular to the planar mirror 440. In embodiments, the first optical element 450 may especially comprise a lens.

Figure 1B:
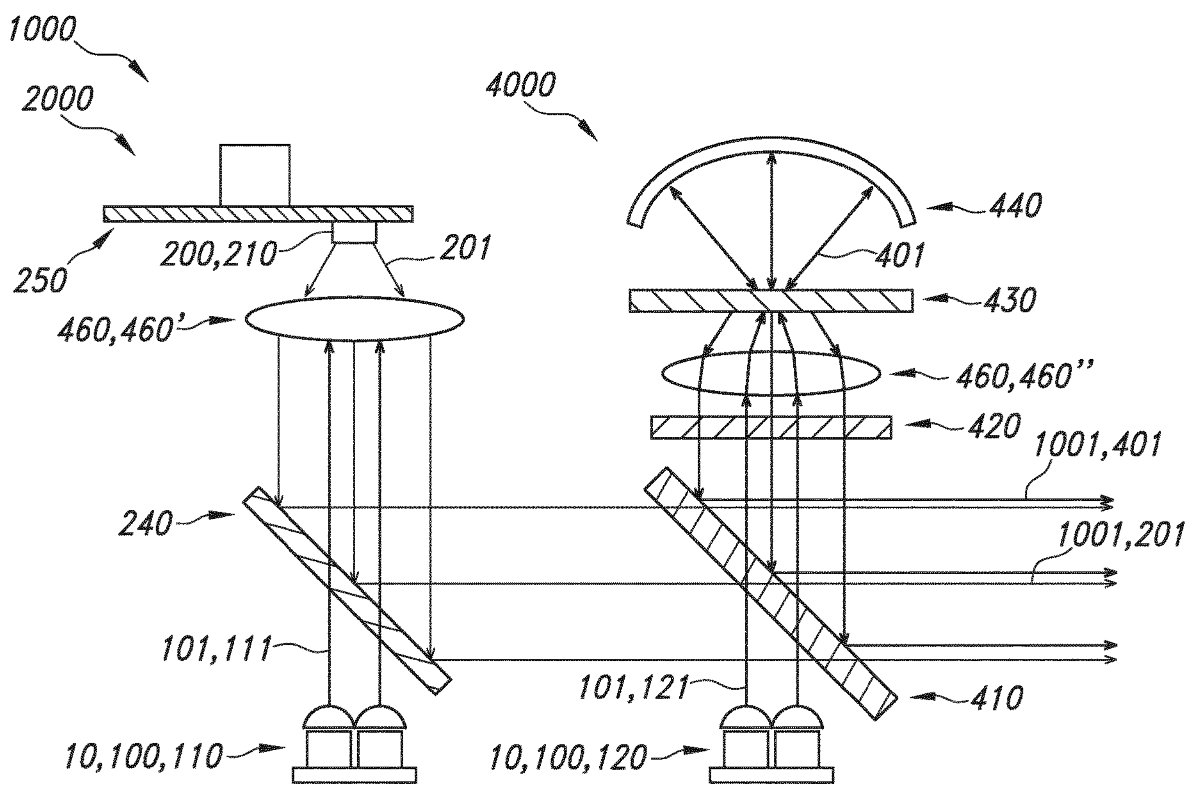

As depicted in FIG. 1B. in some other embodiments, the mirror 440 may comprise a curved mirror 440. Especially, in embodiments, the mirror 440 may comprise a concave mirror 440. In such embodiments, at least part of the diffused device light 401 may especially be perpendicularly reflected off the curved mirror 440.

Furthermore, the mirror 440 may comprise a metallic mirror 440. Especially, in embodiments, the mirror 440 may comprise a material selected from the group comprising aluminum, gold, copper, and silver.

The light generating system 1000 may also comprise one or more second optical elements 460, see FIGS. 1A, 1, 3, and 4. Especially, the one or more second optical elements 460 may be configured to collimate device light 101. More especially, one or more of the following may apply: (i) a primary second optical element 460,460' may be configured between at least one of the one or more light generating devices 100 and the luminescent material 200, and (ii) a secondary second optical element 460,460" may be configured between the waveplate 420 and the diffuser 430.

The specularly reflective mirror 440 may reverse the polarization of the diffused device light 401. Hence, the diffused device light 101, 401 may comprise different polarizations while propagating through the system 1000. This difference may especially be exploited as the polarizing beam splitter 410 may be configured transmissive for one of the light having the first polarization and light having the second polarization and reflective for the other one of the light having the first polarization and the light having the second polarization. In embodiments, the first polarization and the second polarization may especially be linear polarizations. Especially, in embodiments, polarized light comprising the first polarization may especially comprise one of p-polarization and s-polarization. Further, polarized light comprising the second polarization may especially comprise the other one of p-polarization and s-polarization. Hence, in such embodiments, the first polarization and the second polarization may be exact opposites.

Furthermore, the polarization maintaining diffuser 430 may comprise an optically isotropic material. Especially, the polarization maintaining diffuser 430 may comprise a material selected from the group comprising cubic crystals, stress-free glass, and isotropic transparent polymers, such as silicone rubber, PMMA, etc. The polarization maintaining diffuser 430 may also comprise a surface relief, i.e., the surface of the polarization maintaining diffuser 430 may comprise a (pseudo-random) microstructure of depressions and elevations not shown here.

In embodiments, the quarter wave plate 420 may be configured to convert device light 101 having the first polarization to device light 101 having a first circular polarization. Further, the wave plate 420 may be configured to convert diffused device light 401 having a (second) circular polarization to diffused device light 401 having the second polarization.

In further embodiments, the luminescence conversion arrangement 2000 may comprise a dichroic reflector (or "dichroic") 240 configured downstream of one or more of the one or more light generating devices 100. Especially, the dichroic reflector 240 may be configured to transmit (or reflect) device light 101 and to reflect (or transmit) luminescent material light 201. More especially, in embodiments such as depicted here, the primary second optical element 460,460' may be configured between the dichroic reflector 240 and the luminescent material 200.

In embodiments, the one or more light generating devices 100 may comprise a first light generating device 110 and a second light generating device 120. Especially, in embodiments, the first light generating device 110 may be configured to generate first device light 111 and the second light generating device 120 may be configured to generate second device light 121. Further, in embodiments, the luminescence conversion arrangement 2000 may be configured in a light-receiving arrangement with the first light generating device 110. Yet further, in embodiments, the diffuser arrangement 4000 may be configured in a light-receiving arrangement with the second light generating device 120.

Figure 4A:
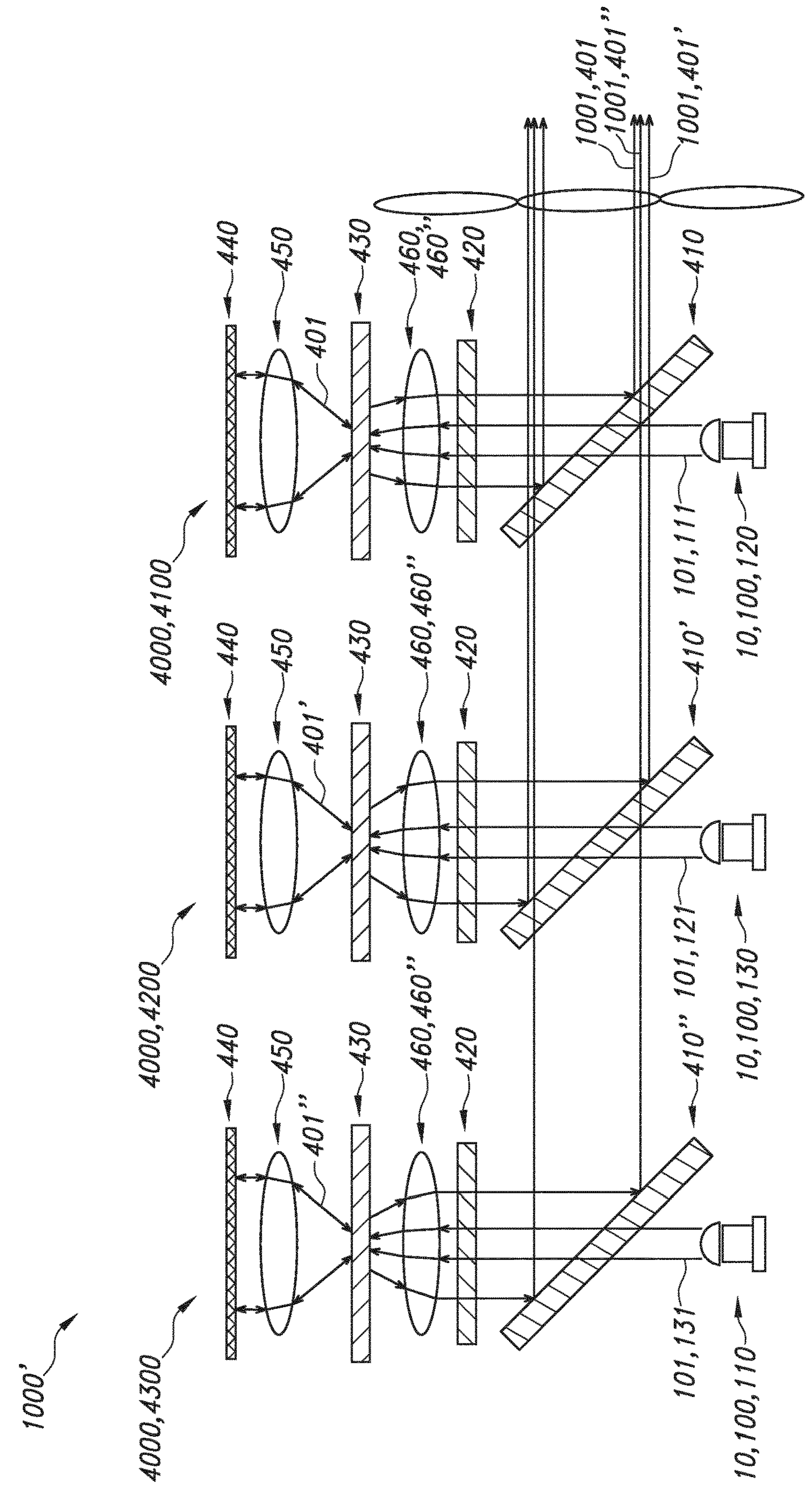
FIGS. 4*a*-4*b* schematically depict some additional embodiments applying (only) parts of the light generating system as described herein.
Figure 4B:
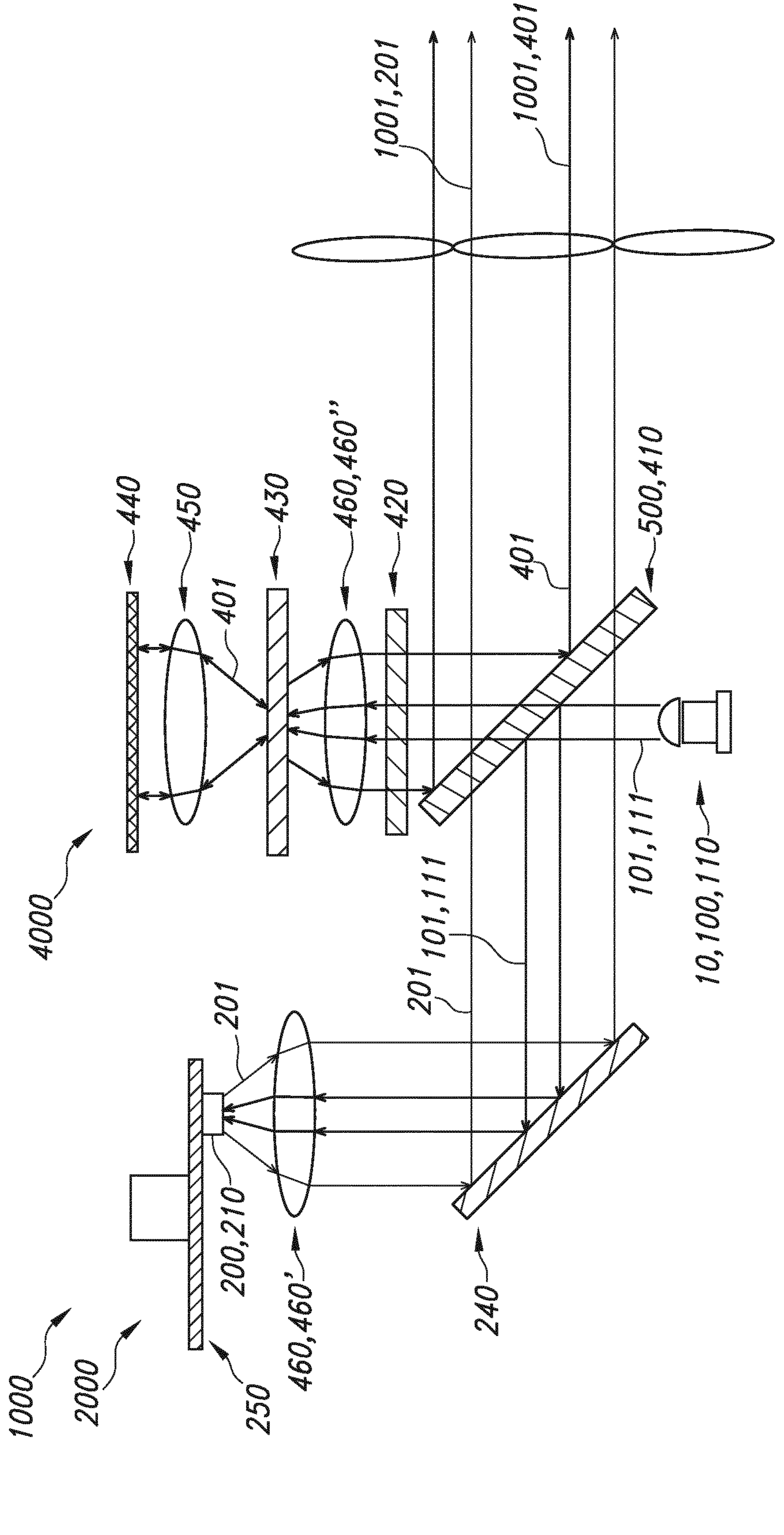

In embodiments, the light generating system 1000 may also comprise only one (type of) light generating device 100, as is depicted in FIG. 4B. In such embodiments, the light generating system 1000 may further comprise a beam splitter 500 configured downstream of the light generating device 100, and especially upstream of both the luminescence conversion arrangement 2000 and the diffuser arrangement 4000. In specific embodiments, the beam splitter 500 may be the polarizing beam splitter 410 comprised by the diffuser arrangement 4000.

In other embodiments, not depicted here, the beam splitter 500 may be a half-silvered mirror. The half-silvered mirror may be configured to (i) transmit at least part of the device light 101 to the diffuser arrangement 4000, and to (ii) reflect at least another part of the device light 101 to a third optical element. Especially, the third optical element may be configured to reflect the device light 101, such that the device light 101 propagates to the luminescent material 200 comprised by the luminescence conversion arrangement 2000. More especially, the third optical element may be a reflector, such as a mirror or a dichroic reflector.

Hence, the beam splitter 500 may be configured to direct at least part of the device light 101 to the luminescence conversion arrangement 2000 and to direct at least another part of the device light 101 to the diffuser arrangement 4000.

As the light generating system 1000 comprises a luminescence conversion arrangement 2000 comprising a luminescent material 200, the light generating system 1000 may generate heat. Such heat may have a negative effect on the e.g. the performance of the luminescent material 200. Hence, in embodiments, the light generating system 1000 may further comprise a rotatable device 250. Especially, the rotatable device 250 may comprise one of the group comprising as a phosphor wheel and a phosphor rod. Especially, the rotatable device 250 may be configured to support the luminescent material 200. More especially, the rotatable device 250 may be configured to support a ring of luminescent material 200.

Further, in embodiments, the rotatable device 250 may comprise a thermally conductive material, i.e., may comprise a heat sink or may thermally conduct heat to a heat sink. Hence, the luminescent material 200, e.g. configured on a phosphor wheel, may be configured in thermal contact with the thermally conductive material. However, in embodiments without a phosphor wheel, also a thermally conductive material, may be configured in thermal contact with the luminescent material 2200. For instance, in embodiments the luminescent material 200 may be configured in physical contact with the thermally conductive material.

In embodiments, the luminescent material 200 may comprise a first luminescent material 210 configured to generate first luminescent material light 201. More especially, the first luminescent material may be configured to generate first luminescent material light 201 having a spectral power at one or more wavelengths in the green-yellow wavelength range. Hence, in embodiments, the device light 101 may at least comprise blue light and the luminescent material 200 may be configured to convert the blue device light 101 into green-yellow luminescent material light 201, such as yellow luminescent material light 201. Furthermore, the first luminescent material 210 may be of the type $A_3B_5O_{12}$:Ce. Especially, A may comprise one or more of Y, La, Gd, Tb and Lu, and B may comprise one or more of Al, Ga, In and Sc.

In further embodiments, the luminescent material 200 may comprise a second luminescent material 220. Especially, the second luminescent material 220 may be configured to convert at least part of the (blue) device light 101 into second luminescent material light 201 having a different spectral power distribution from the first luminescent material light 201. More especially, the second luminescent material light 201 may have spectral power at one or more wavelengths in the orange-red wavelength range.

Figure 2:
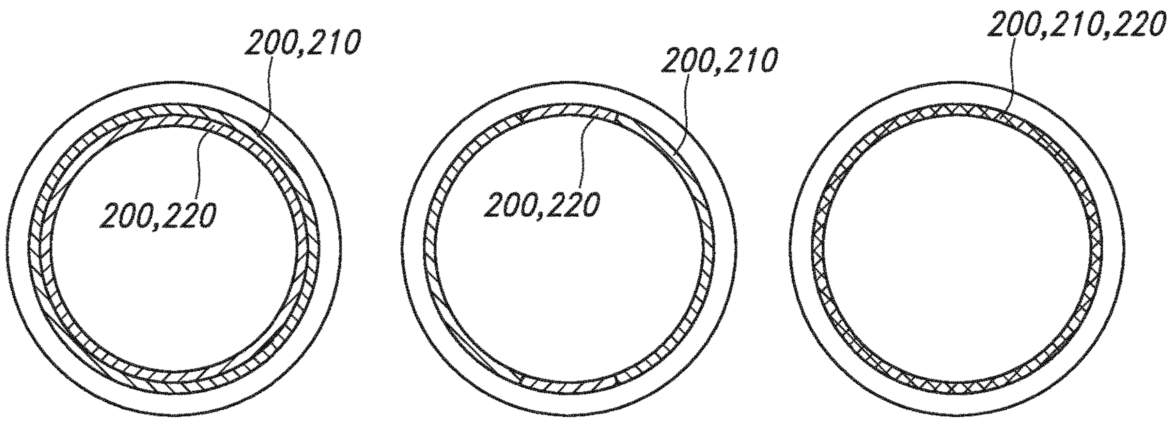

For example, as is depicted in FIG. 2, the luminescent material 200 may comprise (a ring comprising) alternating sections of first luminescent material 210 and second luminescent material 220 (i.e., the middle embodiment in FIG. 2). In other embodiments, the luminescent material 200 may comprise a first ring of first luminescent material 210 with a second concentric ring of second luminescent material 220 (i.e., the left embodiment in FIG. 2). In yet other embodiments, the luminescent material 200 may comprise a mix of the first luminescent material 210 and the second luminescent material 220 (i.e., the right embodiment in FIG. 2).

Hence, in embodiments, the luminescence conversion arrangement 2000 may comprise two (or more) luminescent materials 200. Especially, the two (or more) luminescent materials 200 may be selected from the group comprising a yellow luminescent material 200, a red luminescent material 200, and a green luminescent material 200.

Figure 3:
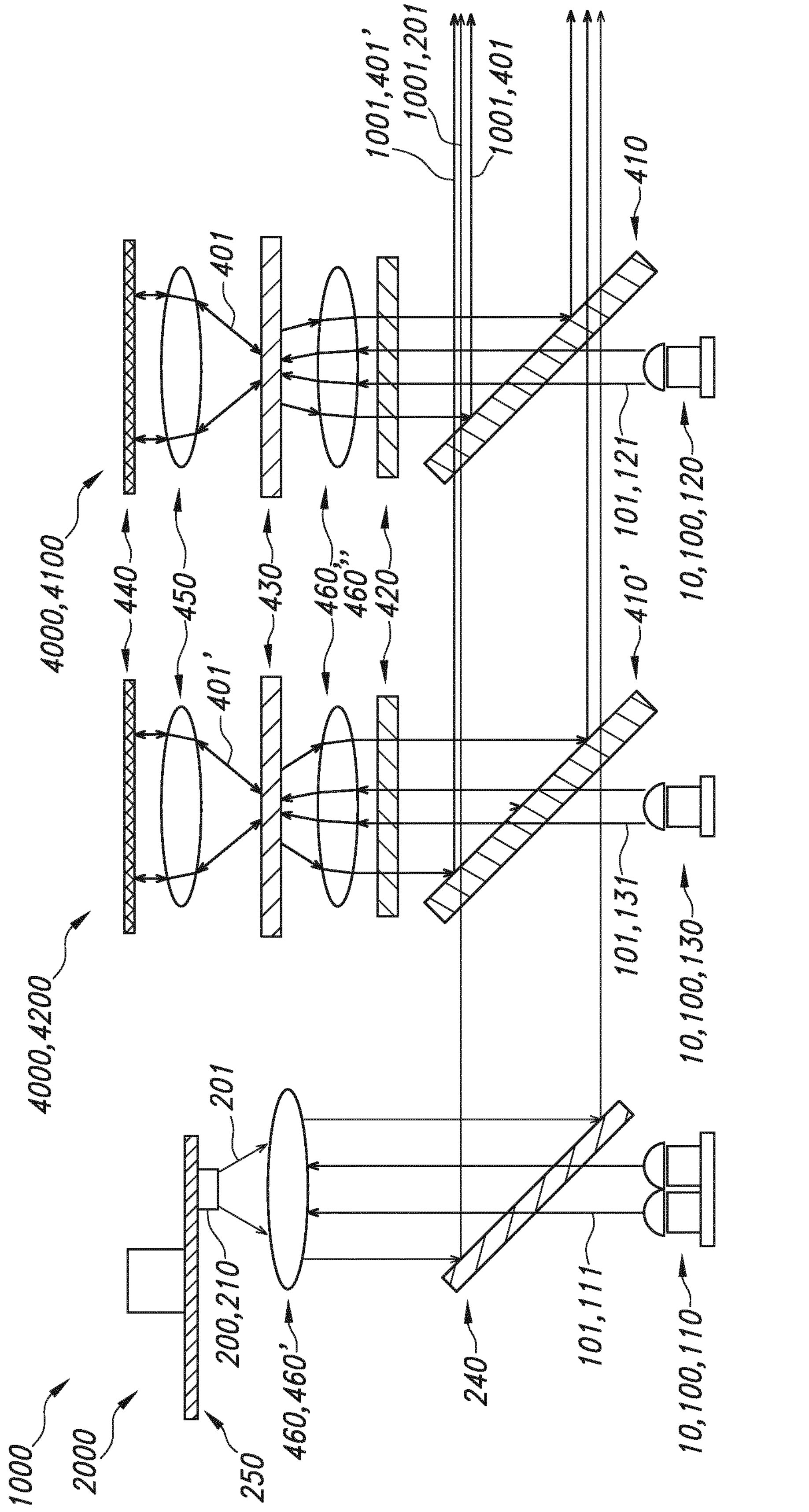

FIG. 3 schematically depicts an embodiment of the light generating system 1000 comprising a first diffuser arrangement 4100 and a second diffuser arrangement 4200. Furthermore, the light generating system 1000 comprises a first light generating device 110, a second light generating device 120 and a third light generating device 130. Especially, the first light generating device 110 may be configured to generate first device light 111. Especially, the second light generating device 120 may be configured to generate second (blue) device light 121. Especially, the third light generating device 130 may be configured to generate third (red) device light 131. In embodiments, the luminescence conversion arrangement 2000 may be configured in a light-receiving relationship with the first light generating device 110, and configured to provide the (yellow-green) luminescent material light 201. Further, in embodiments, the first diffuser arrangement 4100 may be configured in a light-receiving relationship with the second light generating device 120, and configured to provide the diffused (first) device light 401. Yet further, in embodiments, the second diffuser arrangement 4200 may be configured in a light-receiving relationship with the third light generating device 130. Especially, the second diffuser arrangement 4200 may be configured to generate diffused (third) device light 401' from at least part of the second device light 121 received by the second diffuser arrangement 4200. Hence, in such embodiments, the light generating system 1000 may be configured to generate system light 1001 comprising in the operational mode of the light generating system 1000 (*i*) the diffused device light 401, (ii) the luminescent material light 201, and (iii) the diffused third device light 401'.

Hence, the system light 1001 may comprise at least the luminescent material light 201 and the diffused device light 401. In embodiments, the system light 1001 may in the operational mode of the light generating system 1000 especially comprise white light. Especially, the system light 1001 may comprise white light having a correlated color temperature in a range from 2000-10000 K and a color rendering index of at least 80.

FIG. 4 schematically depicts an embodiment of an alternative light generating system 1000' comprising a first diffuser arrangement 4100, a second diffuser arrangement 4200, and a third diffuser arrangement 4300 as described above. In short, especially, the alternative light generating system 1000 may comprise a first light generating device 110, configured to provide first device light 111 having a wavelength in the blue wavelength range to the first diffuser arrangement 4100. The first diffuser arrangement 4100 may, in embodiments, convert the blue first device light 111 into blue first diffused device light 401.

Further, the alternative light generating system 1000 may comprise a second light generating device 120, configured to provide second device light 121 having a wavelength in the red wavelength range to the second diffuser arrangement 4200. The second diffuser arrangement 4200 may, in embodiments, convert the red second device light 121 into red diffused second device light 401'.

Yet further, the alternative light generating system 1000 may comprise a third light generating device 130, configured to provide third device light 131 having a wavelength in the green wavelength range to the third diffuser arrangement 4300. The third diffuser arrangement 4300 may, in embodiments, convert the green third device light 131 into green diffused third device light 401".

Hence, in embodiments, the alternative light generating system 1000 may be configured to generate white system light 1001 comprising, in the operational mode of the alternative light generating system 1000, the blue first, red second, and green third diffused device light 401, 401', 401".

Referring to FIGS. 1*a*-1*b*, 3, and 4*a*-*b*, a first diffuser arrangement may comprise polarization maintaining diffuser which is transmissive for the device light directed to this polarization maintaining diffuser. Hence, the device light, received by this polarization maintaining diffuser may be transmitted and diffused (especially while essentially maintaining the polarization). Likewise, a second diffuser arrangement may comprise polarization maintaining diffuser which is transmissive for the device light directed to this polarization maintaining diffuser. Hence, the device light, received by this polarization maintaining diffuser may be transmitted and diffused (especially while essentially maintaining the polarization). Likewise, a third diffuser arrangement may comprise polarization maintaining diffuser which is transmissive for the device light directed to this polarization maintaining diffuser. Hence, the device light, received by this polarization maintaining diffuser may be transmitted and diffused (especially while essentially maintaining the polarization). Further, referring to these figures, for instance two alternative embodiments may apply:

(i) the polarizing beam splitter (410) is configured to transmit the device light having a first linear polarization. Subsequently, the wave plate is configured to convert transmitted device light having a first linear polarization (e.g. p-polarized light) into first circularly polarized light having a first handedness (e.g. left handed). Subsequently, the metallic reflector is configured to reflect the first circularly polarized light having the first handedness into second circularly polarized light having a second handedness (e.g. right handed). Subsequently, the wave plate is configured to convert second circularly polarized light having a second handedness into device light having a second linear polarization (e.g. s-polarized light). The device light having the second linear polarization is 90 degrees rotated with respect to the device light having the first linear polarization. Subsequently, the polarizing beam splitter (410) reflects the device light having a second linear polarization; or (ii) the polarizing beam splitter (410) is configured to reflect the device light having a first linear polarization. Subsequently, the wave plate is configured to convert reflected device light having a first linear polarization (e.g. p-polarized light) into first circularly polarized light having a first handedness (e.g. left handed). Subsequently, the metallic reflector is configured to reflect the first circularly polarized light having the first handedness into second circularly polarized light having a second handedness (e.g. right handed). Subsequently, the wave plate is configured to convert second circularly polarized light having a second handedness into device light having a second linear polarization (e.g. s-polarized light). The device light having the second linear polarization is 90 degrees rotated with respect to the device light having the first linear polarization. Subsequently, the polarizing beam splitter (410) transmit the device light having a second linear polarization.

Figure 5:
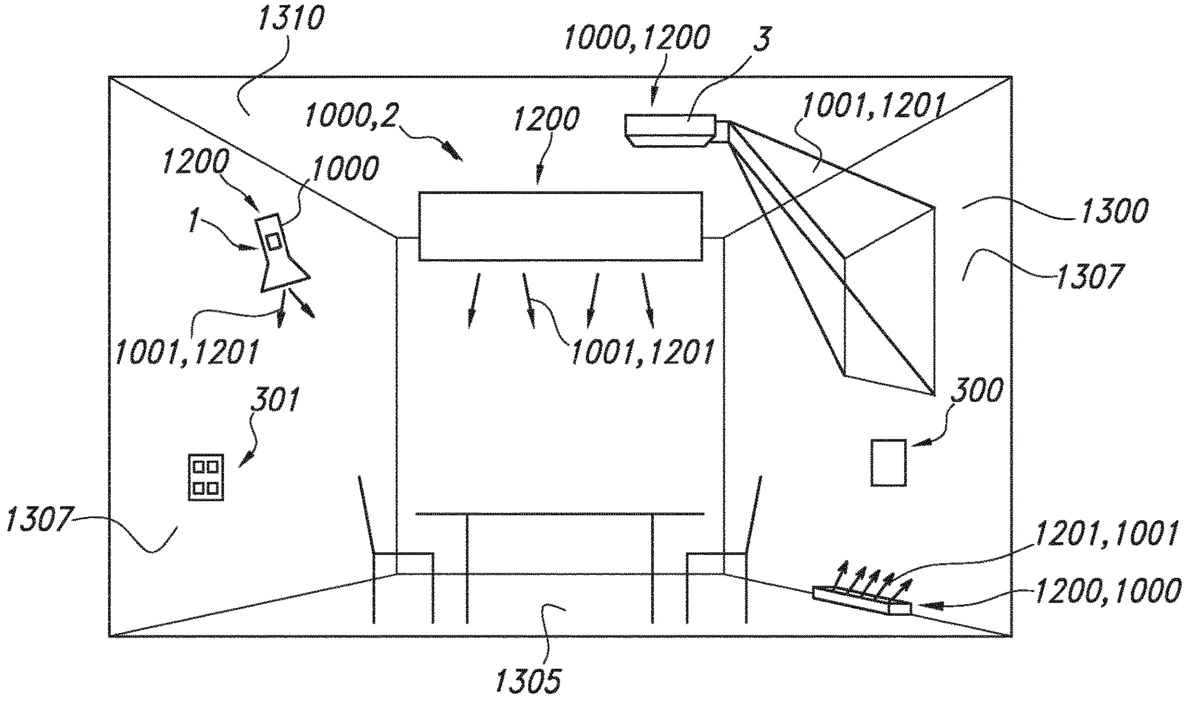
FIG. 5 schematically depicts an embodiment of an application.

FIG. 5 schematically depicts an embodiment of a luminaire 2 comprising the light generating system 1000 as described above. Reference 301 indicates a user interface which may be functionally coupled with the control system 300 comprised by or functionally coupled to the light generating system 1000. The control system 300 may be configured to control the one or more light generating devices 100, especially the first light generating device 110 and the second light generating device 120 (and third light generating device 130). FIG. 5 also schematically depicts an embodiment of lamp 1 comprising the light generating system 1000. Reference 3 indicates a projector device or projector system, which may be used to project images, such as at a wall, which may also comprise the light generating system 1000. Hence, FIG. 5 schematically depicts embodiments of a lighting device 1200 selected from the group of a lamp 1, a luminaire 2, a projector device 3, a disinfection device, a photochemical reactor, and an optical wireless communication device, comprising the light generating system 1000 as described herein. In embodiments, such lighting device may be a lamp 1, a luminaire 2, a projector device 3, a disinfection device, or an optical wireless communication device. Lighting device light escaping from the lighting device 1200 is indicated with reference 1201. Lighting device light 1201 may essentially consist of system light 1001, and may in specific embodiments thus be system light 1001. Reference 1300 refers to a space, such as a room. Reference 1305 refers to a floor and reference 1310 to a ceiling; reference 1307 refers to a wall.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the operational modes as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising (i) one or more light generating devices, (ii) a luminescence conversion arrangement, and (iii) a diffuser arrangement, wherein:

the one or more light generating devices are configured to generate device light; wherein the one or more light generating devices comprises a solid state light source, wherein the solid state light source comprises one or more of a laser diode and a super luminescent diode; wherein the light generating system is configured such that, in an operational mode of the light generating systems, (a) at least part of the device light propagates to the luminescence conversion arrangement, and (b) at least part of the device light propagates to the diffuser arrangement; wherein the at least part of the device light propagating to the diffuser arrangement is polarized light comprising one of a first linear polarization and a second linear polarization;

the luminescence conversion arrangement comprises a luminescent material configured to convert at least part of the device light received by the luminescent material into luminescent material light; wherein the luminescent material is configured in the reflective mode relative to device light irradiating the luminescent material;

the diffuser arrangement is configured to generate diffused device light from at least part of the device light received by the diffuser arrangement; wherein the diffuser arrangement comprises a polarizing beam splitter, a quarter wave plate, a polarization maintaining diffuser, and a specularly reflective mirror, wherein the mirror comprises a metallic mirror;

the polarizing beam splitter is (i) transmissive for one of the light having the first linear polarization and light having the second linear polarization and (ii) reflective for the other one of the light having the first polarization and the light having the second linear polarization;

the quarter wave plate is configured between the polarizing beam splitter and the polarization maintaining diffuser; the polarization maintaining diffuser is configured between the quarter wave plate and the specularly reflective metallic mirror; wherein the polarization maintaining diffuser is configured as a diffuser for device light having a polarization imposed by the quarter wave plate to the device light;

one or more second optical elements are configured to collimate device light, wherein one or more of the following applies: (i) a primary second optical element is configured between the one or more light generating devices and the luminescent material, and (ii) a secondary second optical element is configured between the waveplate and the diffuser; and the light generating system is configured to generate system light comprising in the operational mode of the light generating system (i) the diffused device light and (ii) the luminescent material light.

2. The light generating system according to claim 1, wherein the mirror comprises a planar mirror, wherein the diffuser arrangement comprises a first optical element, wherein the first optical element is configured between the polarization maintaining diffuser and the mirror, wherein the first optical element is configured to collimate at least part of the diffused device light into a beam perpendicular to the mirror, wherein the first optical element comprises a lens.

3. The light generating system according to claim 1, wherein the mirror comprises a curved mirror, wherein at least part of the diffused device light is perpendicularly reflected off the curved mirror.

4. The light generating system according to claim 1, wherein polarized light comprising the first polarization is linearly polarized light, wherein polarized light comprising the first polarization comprises one of p-polarization and s-polarization, and wherein the polarized light comprising the second polarization is linearly polarized light, wherein polarized light comprising the second polarization comprises the other one of p-polarization and s-polarization.

5. The light generating system according to claim 1, wherein the polarization maintaining diffuser comprises an optically isotropic material.

6. The light generating system according to claim 1, wherein one of the following applies: (i) the polarizing beam splitter is configured to transmit the device light having the first linear polarization; the quarter wave plate is configured to convert transmitted device light having the first linear polarization into first circularly polarized light having a first handedness; the specularly reflective metallic mirror is configured to reflect the first circularly polarized light having the first handedness into second circularly polarized light having a second handedness; the quarter wave plate is configured to convert second circularly polarized light having the second handedness into device light having a second linear polarization, wherein the device light having the second linear polarization is 90° rotated with respect to the device light having the first linear polarization; the polarizing beam splitter is configured to reflect the device light having the second linear polarization; (ii) the polarizing beam splitter is configured to reflect the device light having the first linear polarization; the quarter wave plate is configured to convert reflected device light having the first linear polarization into first circularly polarized light having a first handedness; the specularly reflective metallic mirror is configured to reflect the first circularly polarized light having the first handedness into second circularly polarized light having a second handedness; the quarter wave plate is configured to convert second circularly polarized light having the second handedness into device light having the second linear polarization, wherein the device light having the second linear polarization is 90° rotated with respect to the device light having the first linear polarization; and the polarizing beam splitter is configured to transmit the device light having the second linear polarization.

7. The light generating system according to claim 1, wherein the luminescence conversion arrangement further comprises a dichroic reflector configured downstream of one or more of the light generating devices, wherein the dichroic reflector is configured to transmit device light and to reflect luminescent material light, and wherein the primary second optical element is configured between the dichroic reflector and the luminescent material.

8. The light generating system according to claim 1, wherein the one or more light generating devices comprise a first light generating device and a second light generating device, wherein the first light generating device is configured to generate first device light, wherein the second light generating device is configured to generate second device light, wherein the luminescence conversion arrangement is configured in a light-receiving relationship with the first light generating device, wherein the diffuser arrangement is configured in a light-receiving relationship with the second light generating device.

9. The light generating system according to claim 1, wherein the light generating system further comprises a rotatable device, wherein the rotatable device is configured to support the luminescent material; wherein the rotatable device comprises a thermally conductive material.

10. The light generating system according to claim 1, wherein the device light at least comprises blue light; wherein the luminescent material comprises a first luminescent material configured to generate first luminescent material light having spectral power at one or more wavelengths in the green-yellow wavelength range; wherein the first luminescent material is of the type $A_3B_5O_{12}$:Ce, wherein A comprises one or more of Y, La, Gd, Tb and Lu, and wherein B comprises one or more of Al, Ga, In and Sc.

11. The light generating system according to claim 10, wherein the light generating system comprises a second luminescent material configured to convert at least part of the device light into second luminescent material having a spectral power distribution different from the first luminescent material light; wherein the second luminescent material light has spectral power at one or more wavelengths in the orange-red wavelength range.

12. The light generating system according to claim 1, wherein luminescence conversion arrangement comprises two or more luminescent materials, wherein the two or more luminescent materials are selected from the group comprising a yellow luminescent material, a red luminescent material, and a green luminescent material.

13. The light generating system according to claim 1, wherein the light generating system comprises a first diffuser arrangement and a second diffuser arrangement, wherein:

the one or more light generating devices comprise a first light generating device, a second light generating device, and a third light generating device, wherein the first light generating device is configured to generate first device light, wherein the second light generating device is configured to generate second device light, wherein the third light generating device is configured to generate third device light;

the luminescence conversion arrangement is configured in a light-receiving relationship with the first light generating device, and configured to provide the luminescent material light;

the first diffuser arrangement is configured in a light-receiving relationship with the second light generating device, and configured to provide the diffused device light;

the second diffuser arrangement is configured in a light-receiving relationship with the third light generating device; wherein the second diffuser arrangement is configured to generate diffused third device light from at least part of the second device light received by the second diffuser arrangement;

the light generating system is configured to generate system light comprising in the operational mode of the light generating system (i) the diffused device light, (ii) the luminescent material light, and (iii) the diffused third device light.

14. The light generating system according to claim 1, wherein the system light comprises in the operational mode of the light generating system white light having a correlated color temperature in a range from 2000 K to 10000 K and a color rendering index of at least 80; and wherein the solid state light source comprises a laser diode.

15. A lighting device selected from the group of a lamp, a luminaire, a projector device, and a stage-lighting device, comprising the light generating system according to claim 1.

* * * * *